(12) United States Patent
Wurm et al.

(10) Patent No.: US 11,311,010 B2
(45) Date of Patent: Apr. 26, 2022

(54) LIGNIN BIOMATERIAL AS AGRICULTURAL DRUG CARRIER

(71) Applicants: Max-Planck-Gesellschaft zur Förderung der Wissenschaften e.V., Munich (DE); Institut für Biotechnologie und Wirkstoff-Forschung gGmbH, Kaiserslautern (DE)

(72) Inventors: Frederik Wurm, Wiesbaden (DE); Katharina Landfester, Mainz (DE); Doungporn Yiamsawas, Bangkok (TH); Eckhard Thines, Mehlingen (DE); Jochen Fischer, Kaiserslautern (DE)

(73) Assignees: MAX-PLANCK-GESELLSCHAFT ZUR FÖRDERUNG DER WISSENSCHAFTEN E.V., Munich (DE); INSTITUT FÜR BIOTECHNOLOGIE UND WIRKSTOFF-FORSCHUNG GGMBH, Kaiserslautern (DE)

( * ) Notice: Subject to any disclaimer, the term of this patent is extended or adjusted under 35 U.S.C. 154(b) by 0 days.

(21) Appl. No.: 16/844,135

(22) Filed: Apr. 9, 2020

(65) Prior Publication Data
US 2020/0390092 A1 Dec. 17, 2020

Related U.S. Application Data

(62) Division of application No. 16/075,503, filed as application No. PCT/EP2017/052559 on Feb. 6, 2017, now abandoned.

(30) Foreign Application Priority Data

Feb. 5, 2016 (EP) .................... 16154480

(51) Int. Cl.
| | |
|---|---|
| *A01N 25/04* | (2006.01) |
| *A01N 25/10* | (2006.01) |
| *A01N 25/28* | (2006.01) |
| *A01N 47/24* | (2006.01) |
| *C08L 33/10* | (2006.01) |
| *C08L 97/00* | (2006.01) |
| *B82Y 40/00* | (2011.01) |

(52) U.S. Cl.
CPC ............ *A01N 25/04* (2013.01); *A01N 25/10* (2013.01); *A01N 25/28* (2013.01); *A01N 47/24* (2013.01); *C08L 33/10* (2013.01); *C08L 97/005* (2013.01); *B82Y 40/00* (2013.01)

(58) Field of Classification Search
CPC ........ A01N 25/28; A01N 47/24; A01N 25/10; A01N 25/04; C08L 33/10; C08L 97/005; B82Y 40/00
See application file for complete search history.

(56) References Cited

U.S. PATENT DOCUMENTS

| | | | |
|---|---|---|---|
| 4,918,167 A | 4/1990 | Glasser et al. | |
| 5,102,992 A | 4/1992 | Glasser et al. | |
| 2003/0013612 A1 | 1/2003 | Asrar et al. | |
| 2008/0234129 A1* | 9/2008 | Asrar ................. | A01N 51/00 504/100 |
| 2009/0110707 A1* | 4/2009 | Winowiski ............ | A01N 25/30 424/405 |
| 2012/0012035 A1* | 1/2012 | Blank .................. | C08H 6/00 106/802 |
| 2013/0231295 A1 | 9/2013 | Gu | |
| 2014/0256545 A1 | 9/2014 | Velev et al. | |
| 2015/0166836 A1 | 6/2015 | Liu et al. | |
| 2015/0368546 A1 | 12/2015 | Washburn et al. | |
| 2016/0120816 A1 | 5/2016 | Jung et al. | |

FOREIGN PATENT DOCUMENTS

| | | |
|---|---|---|
| CN | 101461358 A | 6/2009 |
| CN | 102349509 A | 2/2012 |
| CN | 105010362 A | 11/2015 |
| WO | 9219102 A1 | 11/1992 |

OTHER PUBLICATIONS

Office Action dated May 19, 2020 in AU Application No. 2017214451.
Int'l Search Report and Written Opinion dated May 19, 2017 in Int'l Application No. PCT/EP2017/052559.
Tortora et al, "Ultrasound Driven Assembly of Lignin into Microcapsules for Storage and Delivery of Hydrophobic Molecules," Biomacromolecules, vol. 15, No. 5, pp. 1634-1643 (May 2014).
Bertsch et al, "Grapevine trunk diseases: complex and still poorly understood," Plant Pathology, vol. 62, No. 2, pp. 243-265 (Aug. 2012).
Duval et al, "A review on lignin-based polymeric, micro- and nano-structured materials," Reactive and Functional Polymers, vol. 85, pp. 78-96 (Sep. 2014).
Dula et al., "Preliminary trials on treatment of esca-infected grapevines with trunk injection of fungicides," Phytopathol. Mediterr., vol. 46, pp. 91-95 (2007).
Yiamsawas et al., "Biodegradable lignin nanocontainers," Royal Society of Chemistry Advances, vol. 4, pp. 11661-11663 (2014).

(Continued)

*Primary Examiner* — Doan T Phan
(74) *Attorney, Agent, or Firm* — Panitch Schwarze Belisario & Nadel LLP

(57) ABSTRACT

The present invention provides lignin nanoparticles containing a hydrophobic active agent and a process for the production of the lignin nanoparticles. The process involves the following steps: (i) dissolving modified lignin and a hydrophobic active agent in an organic solvent having low solubility in water; (ii) combining the solution with water and a surfactant to form a pre-emulsion; (iii) forming an emulsion from the pre-emulsion; and (iv) crosslinking the modified lignin to form the lignin nanoparticles, in which the modified lignin is lignin which is chemically modified to contain at least two functional groups suitable for polymerization and/or crosslinking.

20 Claims, 13 Drawing Sheets

(56) References Cited

OTHER PUBLICATIONS

Calvo-Flores et al., "Lignin as Renewable Raw Material," ChemSusChem, vol. 3, pp. 1227-1235 (2010).
Furstner et al., "Alkyne metathesis," Chem. Commun., pp. 2307-2320 (2005).
Makela et al., "Oxalate decarboxylase: biotechnological update and prevalence of the enzyme in filamentous fungi," Appl. Microbiol. Biotechnol., vol. 87, pp. 801-814 (2010).
Rajput et al., "Review Article on Vilsmeier-Haack Reaction," International Journal of Pharmaceutical, Chemical and Biological Sciences, vol. 3, No. 1, pp. 25-43 (2012).
Al-Remawi, "Properties of Chitosan Nanoparticles Formed Using Sulfate Anions as Crosslinking Bridges," American Journal of Applied Sciences, vol. 9, No. 7, pp. 1091-1100 (2012).
Office Action dated Jan. 31, 2020 in EP Application No. 17707188.3.
Office Action dated Jun. 13, 2019 in U.S. Appl. No. 16/075,503 by Wurm.
Office Action dated Dec. 11, 2019 in U.S. Appl. No. 16/075,503 by Wurm.
Editorial Board of Ink Color Bookstore, Tourism Education Press, Encyclopedia of Chinese Juveniles, an Overvalued and Full Color Version, 1st Edition, 3 pages (2014).
Office Action dated Mar. 16, 2021 in CN Application No. 201780021727.X.
Shaohua et al., Vector and its Control in Shenzhen, 1st Edition, 3 pages (2012).
Office Action dated Aug. 26, 2021 in CN Application No. 201780021727.X.

* cited by examiner

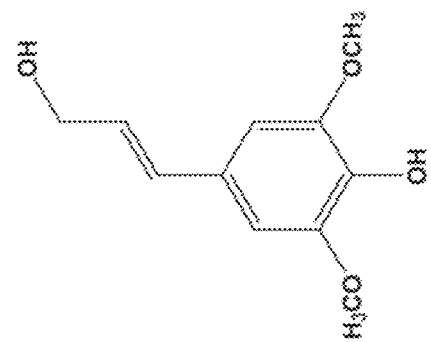
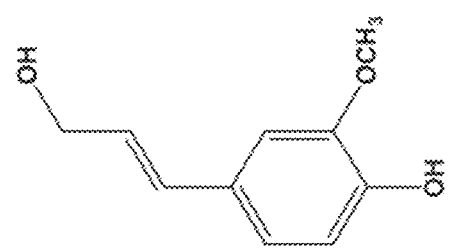
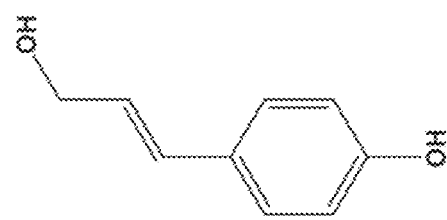
Figure 1

Figure 12

| Entry # | Drug (mg/mL) | Surfactant | Particle size (nm) |
|---|---|---|---|
| 66 | - | Lutensol AT25 | 139 |
| 72 | - | SDS | 147 |
| 77 | 0.35 | SDS | 1000 |
| 78 | 0.7 | SDS | 660 |
| 79 | 0.35 | SDS | 62 |
| 80 | 1 | SDS | 277 |
| 81 | 0.35 | Lutensol AT25 | 136 |
| 82 | 0.75 | Lutensol AT25 | 119 |
| 83 | 0.35 | Lutensol AT25 | 167 |
| 84 | 0.75 | Lutensol AT25 | 168 |

Lignin capsules with olive oil core–lignin shell.

Lignin nanocarriers without the addition of oil or hexadecane.

LIGNIN BIOMATERIAL AS AGRICULTURAL DRUG CARRIER

CROSS-REFERENCE TO RELATED APPLICATIONS

This application is a divisional of co-pending U.S. patent application Ser. No. 16/075,503 filed Aug. 3, 2018, which was a Section 371 of International Application No. PCT/EP2017/052559, filed Feb. 6, 2017, which was published in the English language on Aug. 10, 2017 under International Publication No. WO 2017/134308 A1, which claims priority under 35 U.S.C. § 119(b) to European Application No. 16154480.4, filed on Feb. 5, 2016, the disclosures of which are incorporated herein by reference in their entireties.

TECHNICAL FIELD

The present invention relates to lignin nanoparticles comprising a hydrophobic active agent, a process for producing the same and the use of the nanoparticles for the treatment of plant infections.

BACKGROUND ART

Pesticides are abundantly used in the treatment of plants infected by pests. However, many pesticides are toxic or otherwise damage human health or are harmful to the environment. Therefore, application of pesticides is generally controlled for a certain dosage. The simplest way of applying pesticides is to spray a solution or emulsion/dispersion of the pesticide onto the plants. Unfortunately, a large part of the pesticides which are applied in agriculture is washed out by rain which reduces their effectiveness and causes environmental pollution.

One way to improve effectiveness of pesticides and to reduce environmental impact is to provide controlled release formulations of pesticides in the form of microcapsules, microparticles and granules. Controlled release formulations can limit the rate of transfer of a pesticide into the surrounding environment and can reduce the washout effect so that the total amount of pesticides can be reduced.

US 2003/0013612 A1 discloses a method of producing lignin-based matrix microparticles for the controlled release of an agricultural active which includes forming an emulsion of an organic solution in an aqueous solution, wherein the organic solution contains a lignin derivative and an agricultural active in a volatile organic solvent and the aqueous solution contains an emulsifier; and removing the organic solvent, thereby producing microparticles having a matrix comprising the lignin derivative within which the agricultural active is distributed. The result of this method are small, spherical lignin-based matrix microparticles that release an agricultural active at a controlled rate. The disadvantage of the lignin-based matrix microparticles is that the active ingredient, such as a pesticide, is released over a long time irrespective of whether the plant is infested by a pest or not. Furthermore, the microparticles cannot be transported through the complete vascular system of plants due to the size of the particles.

A further way to reduce the amount of pesticides needed is a method called trunk injection (also known as tree injection, stem injection or xylem injection) in which pesticides are injected into the xylem vascular tissue of, e.g., a tree. This method uses the plant's vascular system to distribute the active compounds into the wood, canopy and roots of the plant. Trunk injection for tree protection is considered to be an environmentally safer alternative for pesticide application since the compound is delivered within the tree, which allows for selective exposure to plant pests. Thus, trunk injection can significantly reduce the non-target exposure of water, soil, air, and wildlife to pesticides.

The Esca disease complex is a disease of grapevines caused by several fungi. The fungi which are associated with the disease are to be found in most cases only in the trunk of the plant. The fungi *Phaeomoniella chlamydospora, Phaeoacremonium aleophilum, Fomitiporia mediterranea,* and *Eutypa lata* are usually associated with the disease. However, other fungi, such as species of the family Botryosphaeriaceae, may also be linked to the disease.

Traditionally, only preventive measures could be carried out for the protection of plants against the Esca-associated fungi. These methods include the wound protection after the pruning of the vines, the identification of infected vines and their removal from the vineyard, as well as the permanent disinfection of the cutting tool used. It has been shown that the use of conventional pesticides, which are in use, for example, for control of powdery mildew, can reduce the rates of infection in the vineyard only slightly. However, the increased use of conventional pesticides has no sufficient effect to justify additional sprayings.

Dula et al. studied the treatment of Esca-infected grapevines with trunk injection of fungicides (Phytopathol. Mediterr. 2007, 46, 91-95). They drilled a 6 mm diameter hole to a depth of at least 25 mm and injected 40 mL of fungicide solution at a pressure of 30 to 40 bar and a dosage of 120 to 180 mL/L. By injecting the fungicide directly into the plant, the fungicide is statistically distributed throughout the plant, which results in a uniform distribution thereof at a low concentration. Therefore, a high amount of fungicide has to be injected in order to achieve a sufficient concentration of the fungicide at the site of the plant infected by fungi.

Tortora et al. synthesized oil-filled microcapsules of kraft lignin by first creating an oil-in-water emulsion followed by a high intensity, ultrasound-assisted cross-linking of lignin at the water/oil interface (Biomacromolecules 2014, 15, 1634-1643). The microcapsules can be used for storage and delivery of hydrophobic molecules, the release of which is triggered by sodium dodecyl sulfate. The lignin microcapsules can be used for topical application as reservoir for skin defender ingredients such as antioxidants and essential oils.

Yiamsawas et al. describe biodegradable nanocontainers which can be prepared by interfacial polyaddition in inverse miniemulsions and can be loaded with hydrophilic substances which can be released by an enzymatic trigger (RSC Adv., 2014, 4 11661). Lignin-polyurea/polyurethane nanocontainers are generated from water-soluble lignin fractions at the interface of stable water nanodroplets in an inverse miniemulsion. However, the method is not suitable for hydrophobic substances.

The aim of the invention is to eliminate the aforementioned shortcomings. In particular, it is an object of the present invention to provide pesticide formulations with higher effectiveness in the treatment of plant infections, in particular fungal infections, and methods of using the same. A further object of the present invention is to provide lignin nanoparticles showing only a very low release of the active agent in the absence of an enzymatic trigger of the fungal/bacterial disease and, thus, exhibit a long storage stability. A further object of the present invention is to provide a method by which grape vine plants which are infected with Esca can effectively be treated.

SUMMARY OF THE INVENTION

The present inventors developed a process for the production of lignin nanoparticles comprising a hydrophobic active agent. The present inventors found that the resulting lignin nanoparticles show a very low leakage of the hydrophobic active agent in the absence of enzymes which degrade lignin. After crosslinking, the lignin nanoparticles, which are loaded with the hydrophobic active agent, exhibit a dense morphology. Only a low leakage of the active agent of 10% or lower (with respect of the total amount of the active agent used in the preparation of the lignin nanoparticles) is detectable after preparation and storage for 4 weeks. The nanoparticles do not release the hydrophobic active agent without the presence (i.e., in the absence) of the enzyme laccase which is produced by fungi or bacteria, e.g., by Esca. Furthermore, the present inventors found that a formulation comprising the lignin nanoparticles can be used for the treatment of plants against fungal or bactericidal infection or the prevention of such an infection. In particular, a formulation comprising the lignin nanoparticles of the present invention can be injected into the stem of a plant. As the nanoparticles do not release the active agent without a trigger, the active agent is trapped in the nanoparticles and is not diluted in the plant tissue. Only in the presence of the fungal or bacterial disease in the trunk and at the place of infection, the nanoparticles are degraded enzymatically and release the drug.

Thus, the present invention provides in a first aspect a process for the production of lignin nanoparticles comprising a hydrophobic active agent, the process comprising the following steps:
(i) dissolving modified lignin and a hydrophobic active agent in an organic solvent having low solubility in water;
(ii) combining the solution with water and a surfactant to form a pre-emulsion;
(iii) forming an emulsion from the pre-emulsion; and
(iv) crosslinking the modified lignin to form lignin nanoparticles comprising the hydrophobic active agent,
wherein the modified lignin is lignin which is chemically modified to comprise at least two functional groups suitable for polymerization and/or crosslinking.

In a second aspect, the present invention provides lignin nanoparticles comprising a hydrophobic active agent, obtainable by the process of the first aspect.

In a third aspect, the present invention provides a lignin nanoparticle comprising a crosslinked lignin and a hydrophobic active agent.

Furthermore, the present invention provides in a fourth aspect an aqueous dispersion containing the lignin nanoparticles according to the second aspect or third aspect.

In a fifth aspect, the present invention provides the use of the lignin nanoparticles according to the second or third aspect or the aqueous dispersion according to the fourth aspect for the treatment of plants against fungal or bactericidal infection.

The present invention also provides in a sixth aspect a method of treating a plant against fungal or bactericidal infection by injecting the aqueous dispersion of the fourth aspect into the stem of the plant.

DESCRIPTION OF THE FIGURES

FIG. 1: Three common monolignol precursors involved in the formation of the lignin, i.e. p-coumaryl alcohol, coniferyl alcohol and sinapyl alcohol.
FIG. 12: Table of selected lignin-nanoparticles for in vivo field test (with different preparation conditions (surfactant, drug concentration, particle size).

DETAILED DESCRIPTION

Figure 2:
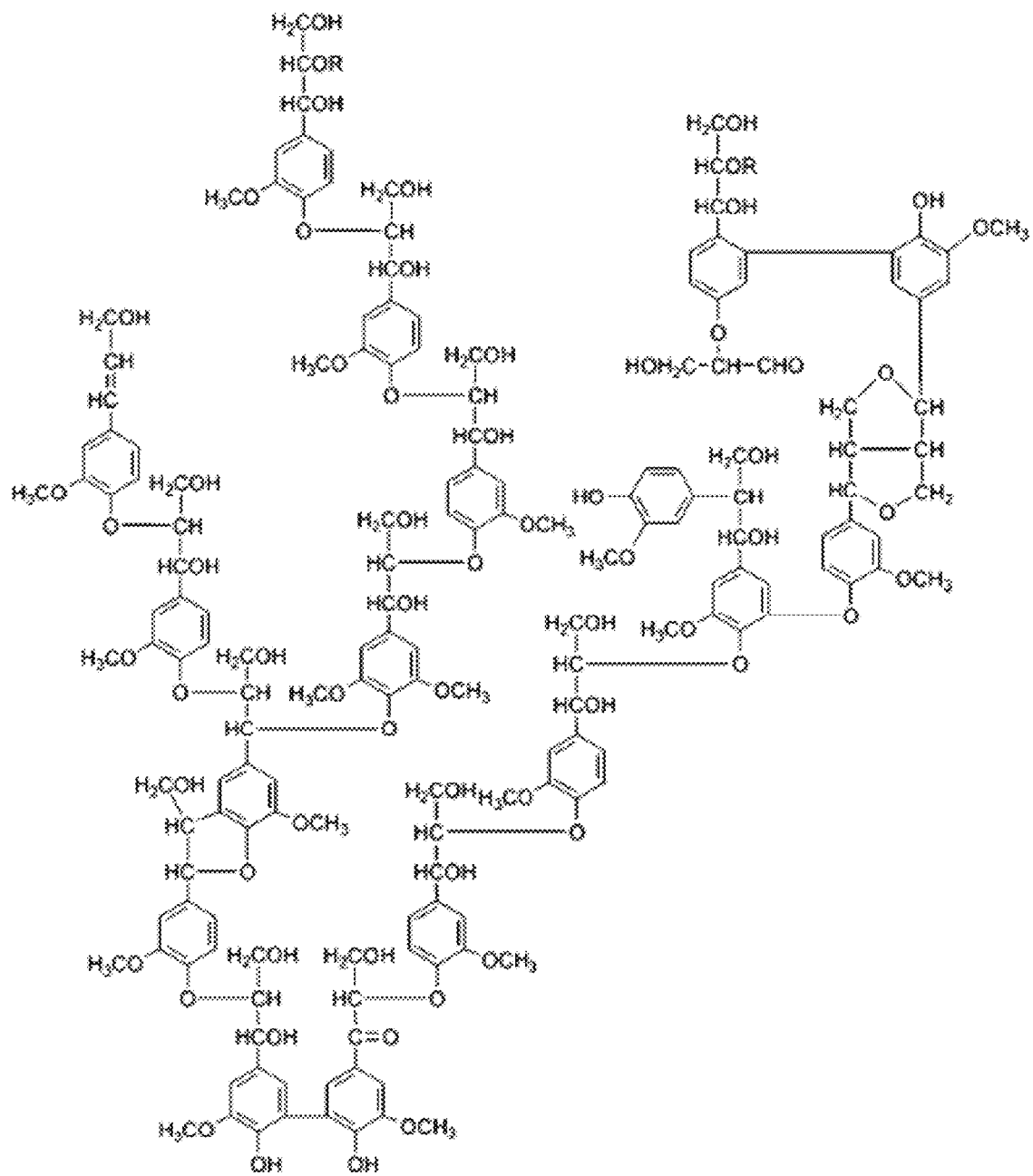
FIG. 2: Structure model of lignin proposed by Adler.

The present invention provides in a first aspect a process for the production of lignin nanoparticles comprising a hydrophobic active agent, the process comprising the following steps:
(i) dissolving modified lignin and a hydrophobic active agent in an organic solvent having low solubility in water;
(ii) combining the solution with water and a surfactant to form a pre-emulsion;
(iii) forming an emulsion from the pre-emulsion; and
(iv) crosslinking the modified lignin to form lignin nanoparticles comprising the hydrophobic active agent,
wherein the modified lignin is lignin which is chemically modified to comprise at least two functional groups suitable for polymerization and/or crosslinking.

Thus, in a first step (step (i)), modified lignin and a hydrophobic active agent are dissolved in an organic solvent having a low solubility in water.

An organic solvent having low solubility in water in accordance with the present invention is an organic solvent having a solubility in water of not more than 100 g/L, preferably not more than 30 g/L, and most preferably not more than 10 g/L.

The organic solvent having low solubility in water includes hydrocarbon solvents such as cyclohexane, hexane, pentane, heptane, benzene and toluene, halogenated hydrocarbons such as dichloromethane, chloroform, carbon tetrachloride, and 1,2-dichloroethane, alcohols such as 1-butanol, 2-butanol, 2-methylpropan-1-ol, 1-pentanol, 2-pentanol, and 3-methyl-1-butanol and organic compounds having a nitro group such as nitrobenzidine and nitrophenols. The organic solvent can also be a mixture of different organic solvents as long as the mixture has low solubility in water as defined above. Most preferably, the organic solvent having low solubility in water is chloroform.

The hydrophobic active agent in accordance with the present invention is a compound having a low solubility in water. Preferably, the hydrophobic active agent has a solubility in water of not more than 100 g/L, more preferably not more than 33 g/L, even more preferably not more than 10 g/L, even more preferably not more than 3 g/L and most preferably not more than 1 g/L.

In addition to a low solubility in water, the hydrophobic active agent preferably has a high solubility in the organic solvent having low solubility in water. Preferably, the hydrophobic active agent has a solubility in the organic solvent of at least 10 g/L, more preferably at least 30 g/L, even more preferably at least 100 g/L and most preferably at least 330 g/L.

Preferably, the solubility of the hydrophobic active agent in the organic solvent is at least 10 times higher than the solubility of the hydrophobic active agent in water, more preferably, the solubility of the hydrophobic active agent in the organic solvent is at least 30 times higher than the solubility of the hydrophobic active agent in water. Thus, the hydrophobic active agent in accordance with the present invention preferably has a solubility in the organic solvent of at least 10 g/L and a solubility in water of not more than 1 g/L, more preferably a solubility in the organic solvent of at least 30 g/L and a solubility in water of not more than 3 g/L, even more preferably a solubility in the organic solvent of at least 100 g/L and a solubility in water of not more than 10 g/L, and most preferably a solubility in the organic solvent of at least 330 g/L and a solubility in water of not more than 33 g/L.

The hydrophobic active agent is preferably a pesticide such as a fungicide or bactericide, most preferably a fungicide. In accordance with the present invention, a fungicide is a biocidal chemical compound which is able to destroy, deter, render harmless, or exert a controlling effect on fungi or fungal spores, and, in particular, is able to kill or inhibit fungi or fungal spores; and a bactericide is a biocidal chemical compound which is able to destroy, deter, render harmless, or exert a controlling effect on bacteria, and, in particular, is able to kill or inhibit bacteria. Examples of the fungicide which can be used in the present invention include strobilurins such as pyraclostrobin, triazole fungicides such as propiconazole and difenoconazole, and benzimidazole fungicide such as thiabendazole.

In the first step, the modified lignin is preferably employed in an amount of 0.1 to 30 g, more preferably 0.5 to 15 g, even more preferably 1 to 10 g, and most preferably 2 to 6 g per 100 g of the organic solvent having low solubility in water. The hydrophobic active agent is preferably employed in the first step in an amount of 10 mg to 5000 mg, more preferably 30 mg to 2000 mg, even more preferably 50 mg to 1000 mg, and most preferably 100 to 500 mg per 100 g of the organic solvent having low solubility in water. With respect to 100 parts by weight (pbw) of modified lignin employed in the first step, the hydrophobic active agent is preferably employed in an amount of 0.1 to 30 pbw, more preferably 0.5 to 15 pbw, and most preferably 1 to 10 pbw.

In the second step of the process of the present invention (step (ii)), the solution obtained in the first step by dissolving modified lignin and a hydrophobic active agent in an organic solvent having low solubility in water is combined with water and a surfactant to form a pre-emulsion. The emulsion is of the oil-in-water type (o/w type). In order to form an o/w type emulsion, the amount of water is preferably higher than the amount of organic solvent employed in the first step.

The amount of water used in the second step is preferably 150 to 2000 pbw, more preferably 200 to 1000 pbw, most preferably 300 to 600 pbw with respect to 100 pbw of organic solvent employed in the first step.

The surfactant employed in the second step of the present invention can be an anionic surfactant, a cationic surfactant, a nonionic surfactant or a mixture thereof. Any conventional surfactant which can assist formation of an o/w emulsion can be used. Examples of the anionic surfactant include sodium dodecyl sulfate (SDS) and lutensol.

Preferred are non-ionic and anionic surfactants and combinations thereof. Suitable non-ionic surfactants are arylaliphatic and aliphatic non-ionic surfactants, e.g. ethoxylated mono, di- and trialkylphenyls having 3 to 50 ethyleneoxide (EO) units and $C_4$-$C_{12}$-alkyl groups, ethoxylated long-chain alcohols having 3 to 50 EO units and $C_8$-$C_{36}$-alkyl groups and polyethylene/polypropyleneoxide block copolymers. Preferably, ethoxylated long-chain alcohols having 10 to 50 EO units and $C_{10}$-$C_{22}$-alkyl groups are used.

Suitable examples of non-ionic surfactants are commercially available as Emulsogen LCN 287, Ethylan A4, Emulan NP50, Emulan TO 3070, Berol 277, Rhodasurf 3065, Triton X-405 and Genapol PF 80 and Lutensol® AT50 ($C_{16}$/$C_{18}$-$(PEO)_{50}$).

The total content of non-ionic surfactants is preferably below 10 wt.-% (weight percent), based on the total amount of modified lignin monomers. The lower limit of the amount of non-ionic surfactants may be 0.5, or 1, or 1.5, or 2, or 2.5, or 3 wt.-%, based on the total amount of monomers. The upper limit of the amount of non-ionic surfactants may be 8, or 7.5, or 7, or 6.5, or 6, or 5.5, or 5 wt.-%, based on the total amount of monomers.

Suitable anionic surfactants that can be used for the preparation of the emulsion according to the present invention can be selected from $C_5$-$C_{30}$ fatty acid salts, rosin acid salts, alkali and ammonium salts of $C_8$-$C_{16}$ alkyl sulphates such as sodium dodecyl sulfate (SDS), ethoxylated $C_8$-$C_{22}$ alkanol sulphates having 2 to 50 EO groups, ethoxylated $C_4$-$C_{12}$ alkyl phenol sulphates having 2 to 50 EO units, $C_{10}$-$C_{18}$ alkyl sulphonates, $C_8$-$C_{18}$ alkyl aryl sulphonates, dialkyl esters of sulphosuccinate, alkyl ether phosphates and alkyl aryl ether phosphates.

Other suitable surfactants can be found in Houben-Weyl, Methoden der organischen Chemie, Vol. 14/1, Makromolekulare Stoffe, Georg Thieme Verlag, Stuttgart, 1961, pages 192 to 208.

Suitable examples of anionic surfactants are commercially available as Texapon T42, Texapon NSO, Dextrol OC 50, Disponil SLS 101 special, Disponil LDBS 25, Empimin PCA 130, Marlon A 350, Dowfax 2A1, Emulsogen EPA 073, Polystep B27, Disponil FES 32, Aerosol OT-75 E, Empimin MA80, Rhodafac RS 610.

The total content of anionic surfactants is preferably below 10 wt.-%, based on the total amount of modified lignin monomers. The lower limit of the amount of anionic surfactants may be 0.5, or 1, or 1.5, or 2, or 2.5, or 3 wt.-%, based on the total amount of monomers. The upper limit of the amount of anionic surfactants may be 8, or 7.5, or 7, or 6.5, or 6, or 5.5 or 5 wt.-%, based on the total amount of monomers.

Suitable cationic surfactants that can be used for the present invention can be selected from aliphatic ammonium salts.

Suitable examples of cationic surfactants are cetyl trimethylammonium bromide, hexadecyl trimethyl ammonium bromide, cetyl trimethylammonium chloride, cetylpyridinium chloride, dimethyldioctadecylammonium chloride, dioctadecyldimethylammonium bromide and those commercially available as Redicote E-5, Redicote E-11, Redicote E-53, Redicote E-606, Redicote 5127, Adogen 477HG, Indulin W-1, Indulin W-5, Indulin SBT.

Other suitable emulsifiers can be found in Houben-Weyl, Methoden der organischen Chemie, Vol. 14/1, Makromolekulare Stoffe, Georg Thieme Verlag, Stuttgart, 1961, pages 192 to 208.

The surfactant is preferably employed in the amount of 0.1 to 10 pbw, preferably 0.3 to 3 pbw, even more preferably 0.5 to 2 pbw with respect to 100 parts by weight of the organic solvent employed in the first step.

After combining the solution obtained in the first step with water and a surfactant in step (ii), a pre-emulsion is formed. This can be achieved by agitating the combined liquids for example by stirring or shaking.

In the third step of the process of the present invention (step (iii)), an emulsion is formed from the pre-emulsion. Thereby, the droplet size of the oil phase is reduced and a narrow size distribution is achieved. Methods of forming the emulsion include ultrasonication and high pressure homogenization (HPH). The droplets of the oil phase of the emulsion obtained in step (iii) preferably have a number average diameter of from 50 nm to 1 μm, more preferably 50 nm to 500 nm, even more preferably 100 to 300 nm as determined by dynamic light scattering (DLS). Preferably, the ultrasonication is carried out under ice cooling in order to prevent evaporation of the solvent. Specifically, the ultrasonication can be carried out for 3 min (½ inch tip, 70% amplitude, 20 s ultrasound followed by 10 s pauses).

Preferably, the emulsion is a miniemulsion, which is a stable emulsion with homogeneous size distribution in which Ostwald ripening of the droplets is suppressed by the use of an osmotic pressure agent. The osmotic pressure agent is a hydrophobic compound with a very low solubility in water, i.e., an ultrahydrophobe. Preferably, the osmotic pressure agent has a solubility in water of less than 0.1 g/l, more preferably less than 10 mg/l, most preferably, less than 1 mg/l, and is preferably selected from the group consisting of $C_{12-20}$ aliphatic hydrocarbons, $C_{12-20}$ aliphatic alcohols, $C_{12-20}$ alkylacrylates, $C_{12-20}$ alkyl mercaptans, organic dyes, fluorinated alkanes, silicone oils, natural and synthetic oils, oligomers with a molecular weight of 1,000 to 500,000, and polymers with a molecular weight of 1,000 to 500,000. More preferably, the osmotic pressure agent is at least one $C_{12-20}$ aliphatic hydrocarbon, most preferably hexadecane.

The lignin nanoparticles obtained by the method of the first aspect of the present invention generally have a spherical form which is caused by crosslinking the modified lignin being dissolved in the organic phase which is present in the droplets of the emulsion formed in step (iii) of the process of the first aspect of the present invention. The lignin nanoparticles can be hollow, i.e., in the form of a hollow sphere, porous, or in the form of a solid particle.

Herein, a "hollow sphere" refers to a particle in which the crosslinked lignin is present in a spherical shell forming the surface of the particle. Hollow particles are preferably obtained when in step (i) of the process for the production of lignin nanoparticles according to the present invention a large amount of the osmotic pressure agent is employed, i.e., if the weight ratio of modified lignin to osmotic pressure agent (modified lignin:osmotic pressure agent) is in the range from 5:1 to 1:1, more preferably from 4:1 to 2:1, even more preferably from 3.5:1 to 2.5:1, most preferably about 3:1. In the preparation of hollow lignin nanoparticles, preferably a non-volatile oil is added which remains after evaporation of the organic solvent having low solubility in water in step (v). Examples of the non-volatile oil include plant oils (e.g. olive, palm, coconut, corn, cornseed, peanut, sesame, soybean, sunflower, almond, rapeseed oil).

A "solid particle" refers to a particle in which the crosslinked lignin and the hydrophobic active agent are homogeneously distributed throughout the particle, i.e., a "full particle". In other words, the "solid particle" is not hollow. The particles of the present invention are preferably in the form of a solid particle. The solid particles often show the lowest leakage of the hydrophobic active agent. In particular, the lignin nanoparticles of the present invention preferably show a leakage of the active agent in aqueous dispersion in the absence of laccase under ambient conditions of not more than 30 wt.-%, more preferably not more than 20 wt.-%, most preferably not more than 10 wt.-%. Preferably, when an aqueous dispersion containing the lignin nanoparticles (such as in the aqueous dispersion, obtainable by the process of the present invention after evaporating the organic solvent) is stored at 25° C. for 30 days in the absence of laccase, the hydrophobic active agent is released from the lignin nanoparticles by not more than 20 wt %, more preferably not more than 10 wt %, most preferably not more than 5 wt %, based on the total amount of the hydrophobic active agent in used in the preparation of the lignin nanoparticles.

Lignin nanoparticles in the form of "solid particles" are preferably obtained when in step (i) of the process for the production of lignin nanoparticles according to the present invention a small amount of the osmotic pressure agent is employed, i.e., if the weight ratio of modified lignin to osmotic pressure agent (modified lignin:osmotic pressure agent) is in the range from 20:1 to 80:1, more preferably from 25:1 to 60:1, even more preferably from 30:1 to 50:1, most preferably about 40:1.

Porous particles can be achieved if no osmotic pressure agent (ultrahydrophobic agent) is added in step (i) of the process for the production of lignin nanoparticles according to the present invention. In the preparation of porous lignin nanoparticles, preferably a nonionic surfactant is employed in step (ii), more preferably lutensol.

In the fourth step of the process of the present invention (step (iv)), the modified lignin is crosslinked to form lignin nanoparticles comprising the hydrophobic active agent. Lignin, its modification and the crosslinking step are explained below.

In general, lignin is constituted by phenylpropane units. The three common monolignol precursors involved in the formation of the lignin are shown in FIG. 1, i.e., p-coumaryl alcohol, coniferyl alcohol and sinapyl alcohol. The exact structure of lignin is not known, however, some proposed structures of lignin have been published. One complete structure model as proposed by Adler is shown in FIG. 2 (Calvo-Flores FG, Dobado JA. "Lignin as Renewable Raw Material", ChemSusChem. 2010, 3, 1227).

The lignin used in order to prepare the modified lignin according to the present invention is not particularly limited. However, the lignin should preferably have an at least 10 times higher, more preferably 30 times higher solubility in the organic phase than in the aqueous phase.

Any conventional, commercially available lignin fraction may be employed including kraft lignin, which may be obtained from Aldrich Chemical Co.

In accordance with the present invention, modified lignin refers to lignin which is chemically modified to comprise at least two functional groups per modified lignin molecule which are suitable for polymerization and/or crosslinking. Such functional groups are known to a skilled person. The functional groups include, e.g., terminal double bonds, preferably (meth)acrylate groups, epoxy groups, alkynyl groups, aldehyde groups, keto groups, and silane groups. Herein, the term "(meth)acrylate groups" means acrylate groups, methacrylate groups or a combination thereof, Preferably, at least 50% of the hydroxyl groups present in the lignin before modification are modified.

In the following, methods of modifying lignin and methods of crosslinking modified lignin are described. In these methods chemical reactions are employed which are well-known to the skilled person. Further details of these standard procedures are described in chemical textbooks such as March's Advanced Organic Chemistry, 7th edition, 2013.

Lignin modified with (meth)acrylate groups, i.e., (meth)acrylated lignin, can, for example, be obtained by one of the following methods:
 (a) reacting OH-groups of lignin with (meth)acrylic anhydride;
 (b) reacting OH-groups of lignin with (meth)acryloyl chloride; or
 (c) reacting OH-groups of lignin with epichlorohydrin and reacting the reaction product with (meth)acrylic acid.

Figure 3:
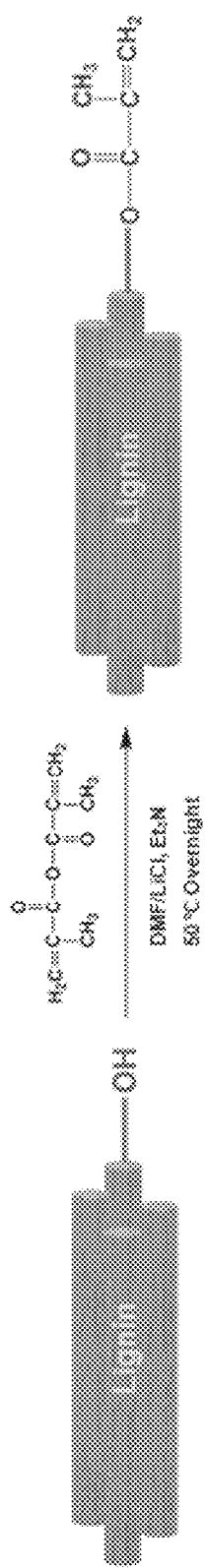
FIG. 3: Schematic representation of an exemplary synthesis of methacrylated lignin.

The synthesis of methacrylated lignin by reaction with (meth)acrylic anhydride is demonstrated in FIG. 3. An ester bond is formed when the hydroxyl groups in lignin attack the carbonyl carbon of methacrylic anhydride. The reaction of OH-groups of lignin with (meth)acrylic anhydride can, for example, be carried out under the following conditions: Lignin is dissolved in an organic solvent which does not have hydroxyl groups (e.g., N,N-dimethylformamide, N-methylformamide, hexamethyl phosphoric triamide, nitromethane, dimethyl sulfoxide, acetonitrile, acetone, acetamide, formamide) to a concentration of ca. 1-20 wt.-% at 0-25° C. Then an equimolar amount of a tertiary amine-base (e.g., triethylamine, pyridine, diisopropylethyl amine, lutidine, triisopropylamine, trimethylamine, 1,8-Diazabicyclo[5.4.0]undec-7-en (DBU), 1,5,7-Triazabicyclo[4.4.0]dec-5-ene (TBD)) is added and (meth)acrylic anhydride is added dropwise. The reaction is allowed to proceed at 0-50° C. for a period of 10 h to go to completion. Workup by removal of the organic solvent, redissolve in an organic solvent to precipitate the ammonium salt (e.g. diethylether, dichloromethane, chloroform), filtration, and drying yield the product.

The reaction of OH-groups of lignin with (meth)acryloyl chloride is conducted in analogy to the reaction with methacryloyl anhydride, by replacing the anhydride in equimolar amounts with methacryloyl chloride.

The reaction of OH-groups of lignin with epichlorohydrin can, for example, be carried out by dissolving lignin in an organic solvent (e.g., N,N-dimethylformamide, N-methylformamide, hexamethyl phosphoric triamide, nitromethane, dimethyl sulfoxide, acetonitrile, acetone, acetamide, formamide) and activating the dissolved lignin by the addition of sodium, potassium or cesium carbonate or the respective hydride followed by adding the desired amount of epichlorohydrin and allowing the reaction mixture to react at 50° C. for 24 h.

Lignin modified with terminal double bonds other than (meth)acrylate groups can, for example, be obtained by dissolving lignin in an organic solvent, activating the dissolved lignin by the addition of sodium, potassium or cesium carbonate or the respective hydride, adding the desired amount of a halogenated olefin and allowing the reaction mixture to react at 50° C. for 24 h.

The crosslinking in step (iv) of lignin having terminal double bonds, preferably (meth)acrylated lignin, can preferably be achieved by:
 (1) adding an amine compound having at least 2 amino groups and/or a thiol compound having at least two thiol groups to the emulsion obtained in step (iii) and conducting a Michael addition;
 (2) conducting radical polymerization; or
 (3) adding a diene to the emulsion obtained in step (iii) and conducting olefin metathesis.

The Michael addition can, for example, be carried out at elevated temperatures (40-60° C.) for a period of 8 h under mild stirring. Preferably, the pH is adjusted in the range of 5 to 8 before adding the amine compound.

Examples of suitable amine compounds having at least two amino groups for use in the Michael addition include aliphatic diamines, preferably $\alpha$-$\omega$-$C_{1-8}$ aliphatic diamines such as ethylene diamine, 1,3-diamino propane, 1,4-diaminobutane, 1,5-diamino pentane, and 1,6-diamino hexane, diphenylethylenediamine, 2,2'(ethylenedioxy)bis (ethylamine), diaminocyclohexane, o-phenylenediamine, m-phenylenediamine, p-phenylenediamine, 4,4'-diaminobiphenyl, 1,8-diaminonaphthalene, spermidine, spermine, thermospermine, piperazine, cyclen, cyclam, bis(hexamethylene)triamine, lysine, diethylenetriamine, triiethylenetetraamine, propane-1,2,3-triamine, cyclohexane-1,3,5-triamine, benzene-1,3,5-triamine, tris(2-aminoethyl)amine.

The radical polymerization can, for example, be carried out in the presence of an initiator such as azobisisobutyronitrile (AIBN), dibenzoyl peroxide (DBPO), 2,2'-azobis (2-methylbutyronitrile) (V-59). Here, the ultrasonication in step (iii) is preferably carried out under ice cooling in order to prevent evaporation of the solvent and the initiation of the polymerization due to heating. After the formation of the emulsion, the crosslinking polymerization is preferably carried out at about 60° C. for about 5 hours under mild stirring.

The olefin metathesis can, for example, be carried out by adding the catalyst (Grubbs $2^{nd}$ generation or Grubbs Hoveyda $2^{nd}$ generation catylst) after the formation of the emulsion, and carrying out the crosslinking polymerization preferably at about 60° C. for about 5 hours under mild stirring.

When radical polymerization or olefin metathesis is employed, the ultrasonication in step (iii) is preferably carried out under ice cooling in order to prevent evaporation of the solvent and the initiation of the polymerization due to heating.

Examples of suitable diene compounds for use in olefin metathesis include alpha-omega diolefins such as pentadiene, hexadiene, heptadiene, octadiene, nonadiene and divinylbenzene.

Lignin modified with epoxy groups can, for example, be obtained by reacting OH-groups of lignin with epichlorohydrin as described above.

The crosslinking in step (iv) of the lignin modified with epoxy groups can preferably be achieved by adding an amine compound having at least two amino groups to the emulsion obtained in step (iii). The conditions of this reaction are analogous to the Michael addition reaction of methacrylated lignin with diamines mentioned above.

Examples of suitable amine compounds having at least two amino groups for use in the reaction with epoxy modified lignin include the amine compounds mentioned above with regard to the Michael addition.

Lignin modified with alkynyl groups, i.e., alkynated lignin, can, for example, be obtained by reacting OH-groups of lignin with halogenated alkynes. This can, for example, be achieved by dissolving lignin in an organic solvent and activating the lignin by the addition of sodium, potassium or cesium carbonate or the respective hydride. Then the desired amount of a halogenated alkyne is added and the reaction mixture is allowed to react at 50° C. for 24 h.

Examples of suitable halogenated alkynes include ω-halogeno substituted alkynes having a terminal triple bond of the formula hal-$(CH_2)_n$-C≡CH, wherein n is 1 to 12 and hal is Cl, Br or I, such as propargyl bromide, propargyl chloride, 4-chloro-1-butyne, 5-brome-1-pentyne, etc.

The crosslinking in step (iv) of the alkynated lignin can preferably be achieved by adding a compound having at least two azide groups to the emulsion obtained in step (iii) and conducting azide-alkyne-cycloaddition.

Examples of catalysts which can be used in the azide-alkyne-cycloaddition include copper and ruthenium catalysts such as copper ascorbate, $CuSO_4$, Cp*RuCl(cod), Cp*RuCl$(PPh_3)_2$.

Examples of suitable the compound having at least two azide groups include 1,3-diazidopropane, 1,4-diazidobutane, 1,5-diazidopentane, 1,6-diazidohexane, 1,7-diazidoheptane, 1,8-diazidooctane, etc.

Alternatively, the crosslinking in step (iv) of the alkynated lignin can be achieved by conducting alkyne metathesis. This reaction is analogous to the olefin metathesis reaction except for using a diyne and a suitable alkyne metathesis catalyst such as those described in Fürstner, A.; Davies, P. W. (2005). "Alkyne metathesis". Chemical Communications (18): 2307-2320 (doi:10.1039/b419143a), the contents of which is incorporated herein by reference.

Lignin modified with aldehyde or keto groups can, for example, be obtained by the Vilsmeier reaction using a substituted amide and phosphorus oxychloride followed by hydrolysis. The Vilsmeier reaction can be carried out in accordance with the Review by Rajput et al. in IJPCBS 2012, 3(1), 25-43 (ISSN 2249-9504), the contents of which is incorporated herein by reference.

The crosslinking in step (iv) of the lignin modified with aldehyde or keto groups can, for example, be achieved by adding a difunctional amine or a difunctional alkoxide to the emulsion obtained in step (iii). Examples of the difunctional amine include the amine compounds mentioned above with regard to the Michael addition. Examples of the difunctional alkoxide include sodium, potassium, rubidium, or cesium salts of ethylene glycol, propylene glycol, diethylene glycol, oligoethylene glycol, glycerol, hexoses, pentoses, sorbitol, or oligoglycerol.

Lignin modified with silane groups can, for example, be obtained by reacting OH-groups of lignin with chlorosilanes. This can, for example, be achieved by dissolving lignin in an organic solvent, adding the desired amount of chlorosilane and allowing the reaction mixture to react at 50° C. for 24 h.

Examples of suitable chlorosilanes include dimethyl chlorosilane, chlorodiphenylsilane, chlorodiisopropylsilane, chlorodiethylsilane, and chloro(methyl)phenylsilane.

The crosslinking in step (iv) of the lignin modified with silane groups can, for example, be achieved by adding a diene and a Pt-catalyst and conducting hydrosilylation. This reaction can be carried out under conditions analogous to the olefin metathesis reaction mentioned above, except for the use of a Pt-catalyst such as Speier's catalyst, Karstedt's catalyst, or Pt/C.

In addition to the above described steps (i) to (iv), the process of the present invention may comprise a fifth step (step (v)) in which the organic solvent is evaporated from the emulsion obtained in the fourth step. During the evaporation process, the lignin particles are formed because water is a poor solvent of crosslinked lignin. Thus, an aqueous dispersion of lignin nanoparticles which comprise the hydrophobic active agent is obtained.

If process step (v) is carried out, the organic solvent should either have a lower boiling point than water or the organic solvent should form an azeotrope with water. Since the organic solvent exhibits low solubility in water, usually an azeotrope is formed as the boiling point of the organic solvent is higher than that of water. Evaporation of the organic solvent can for example be achieved by stirring the reaction mixture in the reaction vessel which is open to the atmosphere, by heating or by applying a vacuum.

In addition to the above described steps (i) to (v), the process of the present invention may comprise a sixth step (step (vi)) in which after the evaporation step (v) the lignin nanoparticles are separated from the aqueous phase. This can be achieved for example by centrifugation, filtration or dialysis.

In addition to the above described steps (i) to (vi), the process of the present invention may comprise a seventh step (step (vii)) in which the remaining water and organic solvent is removed to achieve a powder of lignin nanoparticles which comprise the hydrophobic active agent. This can, for example, be achieved by applying a vacuum, particularly by freeze-drying.

The powder of lignin nanoparticles comprising the hydrophobic active agent obtained in step (vii) can be dispersed in water in order to obtain an aqueous dispersion of said lignin nanoparticles.

In a second aspect, the present invention provides lignin nanoparticles comprising a hydrophobic active agent, obtainable by the process of the first aspect.

In a third aspect, the present invention provides a lignin nanoparticle comprising a crosslinked lignin and a hydrophobic active agent.

The lignin nanoparticles according to the second and third aspect of the present invention preferably have a number average diameter of from 50 nm to 1 µm, more preferably 50 nm to 500 nm, even more preferably 100 to 300 nm as determined by dynamic light scattering (DLS).

The lignin nanoparticles according to the second and third aspect of the present invention generally have a spherical form which is caused by crosslinking the modified lignin being dissolved in the organic phase which is present in the droplets of the emulsion formed in step (iii) of the process of the first aspect of the present invention. The particles can be hollow, i.e., in the form of a hollow sphere, porous, or in the form of a solid particle.

Furthermore, the present invention provides in a fourth aspect an aqueous dispersion containing the lignin nanoparticles according to the second aspect or third aspect. The aqueous dispersion of the fourth aspect is obtainable by the process of the first aspect including steps (i) to (v) or including steps (i) to (vii).

In a fifth aspect, the present invention provides the use of the lignin nanoparticles according to the second or third aspect or the aqueous dispersion according to the fourth aspect for the treatment of plants against fungal or bactericidal infection.

Plants which can be treated in accordance with the present invention generally include vascular plants, in particular *spermatophytes* (i.e., seed plants), more specifically woody plants. Examples of plants include plants of the genera *Vitis, Prunus, Pistacia, Olea, Platanus, Malus, Punica, Ulmus*, and *Nerium*, preferably *Vitis, Prunus, Pistacia*, and *Olea*, more preferably *Vitis*. Specific plant species include grapevines (*Vitis vinifera*), almond (*Prunus dulcis*), peach (*Prunus persica*), pistachio (*Pistacia vera*), and Olive (*Olea europaea*), most preferably grapevines (*Vitis vinifera*).

Examples of the fungal or bactericidal infection of plants include infections caused by a species which is able to degrade lignin. Lignin can be degraded by enzymes produced by fungi or bacteria including laccase, lignin peroxidase, mangan peroxidase, and alkyl-aryl etherase. Fungal species which produce such enzymes includes species of the genera *Phaeomoniella, Phaeoacremonium*, or *Formitiporia*, or the family Botryosphaeriaceae. There is a wide range of *Basidiomycetes*, which produce laccases, lignin peroxidases, mangan peroxidases and other lignin degrading enzymes, for example, fungi of the genera: *Phanerochaete, Phlebia, Ceriporiopsis, Trametes, Agaricus Pleurotus* and others (Lundell, T. K., Mäkelä, M. R., & Hildén, K. (2010). Lignin-modifying enzymes in filamentous basidiomycetes-ecological, functional and phylogenetic review. Journal of basic microbiology, 50(1), 5-20.). *Phanerochaete* which is a genus of fungi in the family Phanerochaetaceae of the division of *Basidiomycota*. Several of the species in this genus are plant pathogens. They infect, for example, platanus and apple trees as well as figs, pomegranates, elms, grapes, cotton, alfalfa and oleander. Most of the species are able to produce lignin peroxidase, mangan peroxidase, alkyl-aryl etherase as many *Basidiomycota* do. Members of this genus could also be a target for our treatment.

Infections which can be treated with the aqueous dispersion according to the present invention include Esca, which is a type of grapevine trunk disease, and which is considered to be caused by species including *Phaeomoniella chlamydospora* (Pch), *Phaeoacremonium aleophilum* (Pal), und *Formitiporia mediterranea* (Fmed).

Fungal infections of almond (*Prunus dulcis*) include infections with *Botryosphaeriaceae, Collophora, Eutypa lata, Phaeoacremonium*, and *Phomopsis amygdali*. Fungal infections of peach (*Prunus persica*) include infections with *Botryosphaeria*. Fungal infections of pistachio (*Pistacia vera*) include infections with *Phaeoacremonium*, and *Botryosphaeria*.

The present invention also provides in a sixth aspect a method of treating a plant against fungal or bactericidal infection by injecting the aqueous dispersion of the fourth aspect into the stem of the plant.

The injection is preferably carried out using the Tree Tech® Microinjection System. Alternatively, other injection systems may be used such as Smart-Shot™ Refillable Tree Injector from treelogic, or Chemjet Tree Injector.

The method of treating a plant against fungal or bactericidal infection by injecting the aqueous dispersion of the fourth aspect into the stem of the plant can, for example, be carried out as follows:

(i) the capsule of the Tree Tech® Microinjection System is filled with an aqueous dispersion of the lignin nanoparticles comprising a hydrophobic active agent in accordance with the present invention, (ii) a hole of a depth of 5 to 9 mm is drilled into the stem the plant, e.g., the trunk of grapevine, using a sterilized drill;

(iii) the Tree Tech® Microinjection System is placed into the hole and activated to start injection of the aqueous dispersion;

(iv) after 24 to 48 hours, the injection system is removed and the hole is closed with wound sealing wax.

With the method described herein, plants (such as grapevine) already infested by fungi (such as Esca) can be treated. The method includes an injection into a living (grapevine) plant. For this purpose, a small hole is drilled into the stem of the plant which causes, however, no lasting damage. The lignin nanoparticles comprising the active agent are transported by way of xylem and phloem circulation, whereby the encapsulated active ingredient is distributed in the capillaries of the plant. The active agent is immobilized in the lignin nanoparticles and is activated and released through enzymatic cleavage of the crosslinked lignin nanoparticles in those parts of the plant which are infected by fungi. Thus, the active agent can exert its action directly at the infected site of the plant.

The present invention provides a curative treatment of already infected grapevine plants. A total loss of the grapevine plant can thus be avoided. Furthermore, the application of the active agent directly into the plant tissue and the subsequent targeted activation of the active agent enables the use of a very small amount of fungicide. Moreover, it is not necessary to apply the active agent at the plant surface. Thus, pollution of the environment with pesticides can be reduced. Terrestrial microorganisms are thus not influenced by applying the active agent. Application of the active agent can be easily repeated at a plant with a trunk diameter of more than 2 cm. This results in a cost-effective alternative to replacement of the plant. The hydrophobic drug cannot be applied per se. When the hydrophilic lignin nanoparticles according to the present invention are injected into an infected plant, the fungicide will only be released at sites of the plant in which the lignin layer is decomposed by pathogenic fungi. Therefore, the fungicide is enriched in the vicinity of the fungi whereby a sufficiently high concentration of the fungicide is achieved to efficiently combat the fungi. The latest field trials also showed that no biological active substance (fungicide) can be isolated from the grapes.

The present invention is summarized by the following preferred embodiments:

1. Process for the production of lignin nanoparticles comprising a hydrophobic active agent, the process comprising the following steps:
   (i) dissolving modified lignin and a hydrophobic active agent in an organic solvent having low solubility in water;
   (ii) combining the solution with water and a surfactant to form a pre-emulsion;
   (iii) forming an emulsion from the pre-emulsion; and
   (iv) crosslinking the modified lignin to form lignin nanoparticles comprising the hydrophobic active agent,
   wherein the modified lignin is lignin which is chemically modified to comprise at least two functional groups suitable for polymerization and/or crosslinking.

2. The process of item 1, which includes after the crosslinking step (iv) a step (v):
   (v) evaporating the organic solvent.

3. The process of item 2, which includes after the step (v) a step (vi):
   (vi) separating the lignin nanoparticles from the aqueous phase.

4. The process of item 3, which includes after the separating step (vi) a step (vii):
   (vii) removing remaining water and organic solvent to achieve a powder of lignin nanoparticles comprising the hydrophobic active agent.

5. The process of item 4, which includes a step (viii):
   (viii) dispersing the lignin nanoparticles comprising the hydrophobic active agent obtained in step (vii) in water using a surface active agent to obtain an aqueous dispersion of said lignin nanoparticles.

6. The process any of one of items 1 to 5, wherein the modified lignin is a lignin which is chemically modified to comprise at least two functional groups per modified lignin molecule which are suitable for polymerization and/or crosslinking.

7. The process of item 6, wherein the functional groups are selected from terminal double bonds, epoxy groups, alkynyl groups, aldehyde groups, keto groups, and silane groups.

8. The process of item 7, wherein the functional groups are (meth)acrylate groups.

9. The process any of one of items 6 to 8, wherein at least 50% of the hydroxyl groups present in the lignin before modification are modified.

10. The process any of one of items 1 to 9, wherein modified lignin is employed in an amount of 0.1 to 30 g, preferably 0.5 to 15 g, more preferably 1 to 10 g, and most preferably 2 to 6 g per 100 g of the organic solvent having low solubility in water.

11. The process any of one of items 1 to 10, wherein the organic solvent having low solubility in water employed in step (i) is an organic solvent having a solubility in water of not more than 100 g/L, preferably not more than 30 g/L, and most preferably not more than 10 g/L.

12. The process of item 11, wherein the organic solvent having low solubility in water is selected from hydrocarbon solvents, halogenated hydrocarbons, alcohols and organic compounds having a nitro group.

13. The process of any one of items 1 to 12, wherein the hydrophobic active agent has a solubility in water of not more than 100 g/L, preferably not more than 33 g/L, more preferably not more than 10 g/L, even more preferably not more than 3 g/L and most preferably not more than 1 g/L.

14. The process of any one of items 1 to 13, wherein the hydrophobic active agent has a solubility in the organic solvent employed in step (i) of at least 10 g/L, preferably at least 30 g/L, more preferably at least 100 g/L and most preferably at least 330 g/L.

15. The process of any one of items 1 to 14, wherein the solubility of the hydrophobic active agent in the organic solvent is at least 10 times higher than the solubility of the hydrophobic active agent in water, preferably, the solubility of the hydrophobic active agent in the organic solvent is at least 30 times higher than the solubility of the hydrophobic active agent in water.

16. The process of any one of items 1 to 15, wherein the hydrophobic active agent is a pesticide, preferably a fungicide or bactericide, most preferably a fungicide.

17. The process of any one of items 1 to 16, wherein the hydrophobic active agent is employed in step (i) in an amount of 10 mg to 5000 mg, preferably 30 mg to 2000 mg, more preferably 50 mg to 1000 mg, and most preferably 100 to 500 mg per 100 g of the organic solvent having low solubility in water.

18. The process of any one of items 1 to 17, wherein the hydrophobic active agent is employed in an amount of 0.1 to 30 pbw, preferably 0.5 to 15 pbw, and most preferably 1 to 10 pbw with respect to 100 parts by weight of modified lignin employed in step (i).

19. The process of any one of items 1 to 18, wherein the organic solvent having low solubility in water employed in step (i) comprises an osmotic pressure agent.

20. The process of item 19, wherein the osmotic pressure agent has a solubility in water of less than 0.1 g/l, more preferably less than 10 mg/l, most preferably, less than 1 mg/l.

21. The process of item 19 or 20, wherein the osmotic pressure agent is selected from the group consisting of $C_{12-20}$ aliphatic hydrocarbons, $C_{12-20}$ aliphatic alcohols, $C_{12-20}$ alkylacrylates, $C_{12-20}$ alkyl mercaptans, organic dyes, fluorinated alkanes, silicone oils, natural and synthetic oils, oligomers with a molecular weight of 1,000 to 500,000, and polymers with a molecular weight of 1,000 to 500,000, is preferably at least one $C_{12-20}$ aliphatic hydrocarbon, and is most preferably hexadecane.

22. The process of any one of items 19 to 21, wherein in step (iii) a miniemulsion is formed.

23. The process of any one of items 19 to 22, wherein weight ratio of modified lignin to osmotic pressure agent is in the range from 5:1 to 1:1, preferably from 4:1 to 2:1, more preferably from 3.5:1 to 2.5:1, most preferably about 3:1 to obtain hollow lignin nanoparticles.

24. The process of any one of items 19 to 22, wherein weight ratio of modified lignin to osmotic pressure agent is in the range from 20:1 to 80:1, preferably from 25:1 to 60:1, more preferably from 30:1 to 50:1, most preferably about 40:1 to obtain solid lignin nanoparticles.

25. The process of any one of items 1 to 24, wherein the surfactant employed in step (ii) is selected from an anionic surfactant, a cationic surfactant, a nonionic surfactant or a combination thereof.

26. The process of item 25, wherein the surfactant is selected from an anionic surfactant or a nonionic surfactant or a combination thereof.

27. The process of any one of items 1 to 26, wherein the emulsion is formed in step (iii) by ultrasonication and/or high pressure homogenization.

28. The process of any one of items 1 to 27, wherein the modified lignin is lignin having terminal double bonds, preferably (meth)acrylated lignin, and the crosslinking in step (iv) is achieved by:
   (1) adding an amine compound having at least two amino groups and/or a thiol compound having at least two thiol groups to the emulsion obtained in step (iii) and conducting a Michael addition;
   (2) conducting radical polymerization; or
   (3) adding a diene to the emulsion obtained in step (iii) and conducting olefin metathesis.

29. The process of item 28, wherein the (meth)acrylated lignin is obtained by one of the following methods:
   (a) reacting OH-groups of lignin with (meth)acrylic anhydride;
   (b) reacting OH-groups of lignin with (meth)acryloyl chloride; or
   (c) reacting OH-groups of lignin with epichlorohydrin and reacting the reaction product with (meth)acrylic acid.

30. The process of any one of items 1 to 27, wherein the modified lignin is a lignin modified with epoxy groups and the crosslinking in step (iv) is achieved by:
   adding an amine compound having at least two amino groups to the emulsion obtained in step (iii).

31. The process of item 30, wherein the lignin modified with epoxy groups is obtained by reacting OH-groups of lignin with epichlorohydrin.

32. The process of any one of items 1 to 27, wherein the modified lignin is an alkynated lignin and the crosslinking in step (iv) is achieved by:

(1) adding a compound having at least two azide groups to the emulsion obtained in step (iii) and conducting azide-alkyne-cycloaddition; or (2) conducting alkyne metathesis.

33. The process of item 32, wherein the alkynated lignin is obtained by reacting OH-groups of lignin with halogenated alkynes.

34. The process of any one of items 1 to 27, wherein the modified lignin is a lignin modified with aldehyde or keto groups and the crosslinking in step (iv) is achieved by:
adding an amine compound having at least two amino groups to the emulsion obtained in step (iii).

35. The process of any one of items 1 to 27, wherein the modified lignin is a lignin modified with silane groups and the crosslinking in step (iv) is achieved by:
conducting hydrosilylation.

36. The process of item 35, wherein the lignin is modified by reacting OH-groups of lignin with chlorosilanes.

37. The process of any one of items 1 to 36, comprising the following steps:
(i) dissolving (meth)acrylated lignin and a fungicide in an organic solvent having low solubility in water;
(ii) combining the solution with water and a surfactant to form a pre-emulsion;
(iii) forming an emulsion from the pre-emulsion; and
(iv) crosslinking the (meth)acrylated lignin by adding an amine compound having at least two amino groups and/or a thiol compound having at least two thiol groups to the emulsion obtained in step (iii) and conducting a Michael addition to form lignin nanoparticles comprising the fungicide; and
(v) evaporating the organic solvent.

38. The process of any one of items 1 to 36, comprising the following steps:
(i) dissolving (meth)acrylated lignin and a fungicide in chloroform;
(ii) combining the solution with water and sodium dodecyl sulfate to form a pre-emulsion;
(iii) forming an emulsion from the pre-emulsion; and
(iv) crosslinking the (meth)acrylated lignin by adding an amine compound having at least two amino groups and/or a thiol compound having at least two thiol groups to the emulsion obtained in step (iii) and conducting a Michael addition to form lignin nanoparticles comprising the fungicide; and
(v) evaporating the organic solvent.

39. The process of item 37 or 38, wherein in step (i) hexadecane is added and a miniemulsion is formed in step (iii).

40. The process of item 37 or 38, wherein in step (i) a plant oil is added and a miniemulsion is formed in step (iii).

41. Lignin nanoparticles comprising a hydrophobic active agent, obtainable by the process of any one of items 1 to 40.

42. Lignin nanoparticles comprising crosslinked lignin and a hydrophobic active agent.

43. The lignin nanoparticles of item 42, wherein the hydrophobic active agent is a pesticide, preferably a fungicide or bactericide, most preferably a fungicide 44. The process of any one of items 1 to 40 or the lignin nanoparticles of any one of items 41 to 43, wherein the lignin nanoparticles are not hollow.

45. The lignin nanoparticles of any one of items 41 to 44 having a number average diameter of from 50 nm to 1 μm, preferably 50 nm to 500 nm.

46. The lignin nanoparticles of any one of items 41 to 45 showing a leakage of the active agent in aqueous solution under ambient conditions of not more than 30 wt. %.

47. The lignin nanoparticles of any one of items 41 to 46, wherein when an aqueous dispersion containing the lignin nanoparticles is stored at 25° C. for 30 days in the absence of laccase, the hydrophobic active agent is released from the lignin nanoparticles by not more than 20 wt %, preferably 10 wt %, more preferably 5 wt %, based on the total amount of the hydrophobic active agent used in the preparation of the lignin nanoparticles.

48. Aqueous dispersion containing the lignin nanoparticles of any one of items 41 to 47.

49. The aqueous dispersion of item 48, which is obtainable by the process of item 2 or 5.

50. Use of the lignin nanoparticles of any one of items 41 to 47 or the aqueous dispersion of item 48 or 49 for the treatment of plants against fungal or bactericidal infection, wherein the hydrophobic active agent is a fungicide or bactericide, respectively.

51. The use of item 50, wherein the infection is caused by a species which is able to degrade lignin.

52. The use of item 50, wherein the infection is caused by a laccase (or lignin peroxidase, mangan peroxidase, alkylaryl etherase) producing species, such as *Phaeomoniella, Phaeoacremonium, Formitiporia,* or *Phanerochaete*.

53. The use of any one of items 50 to 52, wherein the plant is grape vine and the infection is Esca.

54. The use of any one of items 50 to 52, wherein the plant is selected from almond, peach or pistachio.

55. Method of treating a plant against fungal or bactericidal infection by injecting the aqueous dispersion of item 48 or 49 into the stem of the plant, wherein the hydrophobic active agent is a fungicide or bactericide, respectively.

EXAMPLES

Materials

Lignin was purchased from Aldrich Chemical Co. (kraft lignin, alkali). Prior to the experiment, lignin was extracted with propanol and dried in a vacuum oven overnight. The published kraft lignin data show that the amount of hydroxyl groups (aliphatic and phenolic) was 1.24 per 1 phenyl propane unit (PPU or C9 unit, assumed molecular weight of hard wood is 183 g mol$^{-1}$). Methacrylic anhydride, triethylamine, isopropyl alcohol, lithium chloride, and dimethyl formamide (DMF) were also obtained from Aldrich Chemical Co. The lithium chloride was dried at 70° C. in a vacuum oven before use. The nonionic surfactant Lutensol was obtained from BASF. The anionic surfactant sodium dodecylsulfate (SDS) and hexadecane were purchased from Fluka and used as received.

Lignin Characterizations

In order to investigate the structure of lignin and methacrylated lignin, Fourier transform infrared (FTIR) spectra were obtained by Nicolet iS10 with Vertical ATR Accessory. The samples had been dried at room temperature in a vacuum oven. Spectra were recorded between 600 and 4000 cm$^{-1}$ at a resolution of 4 cm$^{-1}$, and averaging 32 scans. Proton nuclear magnetic resonance spectroscopy ($^1$H-NMR) was performed by Bruker AVANCE at 500 MHz. Approximately 5 mg of samples were dissolved in 750 μl of DMSO-d6. The calculation of the degree of substitution was performed by using hexamethylcyclotrisiloxane as internal standard under the same condition. Gel permeation chromatography (GPC) was used to determinate the weight average molecular weight.

Gel-permeation chromatography (GPC) measurements were carried out in DMF, with samples of the concentration of 1 g L$^{-1}$. Sample injection was performed by a 717 plus auto sampler (Waters) at 30° C. DMF. Flow was 1 mL min$^{-1}$. Three SDV columns (PSS) with the dimensions 300×80 mm, 10 µm particle size and pore sizes of 106, 104 and 500 Å were employed.

Detection was accomplished with DRI Shodex RI-101 detector (ERC), UV-Vis S-3702 detector (Soma), and 1260 FLD (Agilent Technologies 1260 Infinity, fluorescence excitation: 520 nm; emission: 540 nm). Calibration was carried out using polystyrene standards provided by Polymer Standards Service.

Glass transition temperature (Tg) of lignins was evaluated using a Mettler Toledo DSC 823 differential scanning calorimeter operating with a heating rate 10° C./min under a nitrogen flow rate of 10 mL/min. The Tg values were calculated as the midpoint of the change in heat capacity. The thermal stability of lignin was studied in terms of thermogravimetric analysis (TGA) from 30 to 900° C. at 10° C./min under nitrogen atmosphere. Before being tested by DSC and TGA, the samples were dried at room temperature under vacuum overnight in order to eliminate the presence of water.

Lignin Particles Characterizations

The hydrodynamic diameter of the particles was measured by DLS with NICOMP 380 at a fixed angle of 90° and a laser diode running at 635 nm, after diluting the sample with water to ca. 0.01 wt.-%. The morphology of particles was observed by TEM with a Zeiss EM912 at an accelerating voltage of 120 kV. Samples were prepared by casting a drop of diluted dispersion (0.1 wt.-%) on a carbon-coated copper grid (300 square meshes) and dried at room temperature.

Antifungal Drug Encapsulation Efficiency

In order to determine the encapsulation efficiency of fungicide loaded in lignin particles, two possible methods were investigated. In the indirect method, a sample was centrifuged at 10000 rpm for 30 min. The supernatant was taken, freeze dried and then dissolved in THF. In the direct method, the pellet after centrifugation was used. The pellet was freeze dried and dissolved in THF to break the nanoparticles. The solutions from both routes were then passed through a 0.2 µm filter and analyzed by high pressure liquid chromatography (HPLC) method with Agilent Elicpse Plus RP18 column; the mobile phase was THF:water (80:20), injection volume was 10 µL and the column temperature was maintained at 20° C. The analysis was performed at a flow rate of 0.2 mL/min with a UV detector at 280 nm. The encapsulation efficiency of pyraclostrobin in the nanoparticles was determined as the mass ratio of the entrapped amount in the nanoparticles to the theoretical amount of pyraclostrobin used in the preparation.

Preparation Example 1

Synthesis of Methacrylated Lignin 2 g of lignin (10 mmol) were dissolved in 60 mL of LiCl/dimethyl formamide (DMF) at 90° C. under argon. After complete dissolution, 1 mL of the triethylamine (10 mmol) was added to the lignin solution and stirred for 15 min at 50° C. 3 mL of methacrylic anhydride (20 mmol) were then slowly injected into the reaction flask. The reaction was kept at 50° C. overnight. The reaction mixture was precipitated in isopropyl alcohol and isolated by centrifugation at 3000 rpm. The product was repeatedly dissolved in chloroform and precipitated in isopropyl alcohol for three times. Then the product was dried at room temperature in a vacuum oven. The yield was about 80%. $^1$H NMR spectroscopy proved the successful attachment of the methacrylate moiety to lignin: —CH$_3$, 2.05-1.7 ppm; CH=CH$_2$, 6.2-5.4 ppm.

Figure 5:
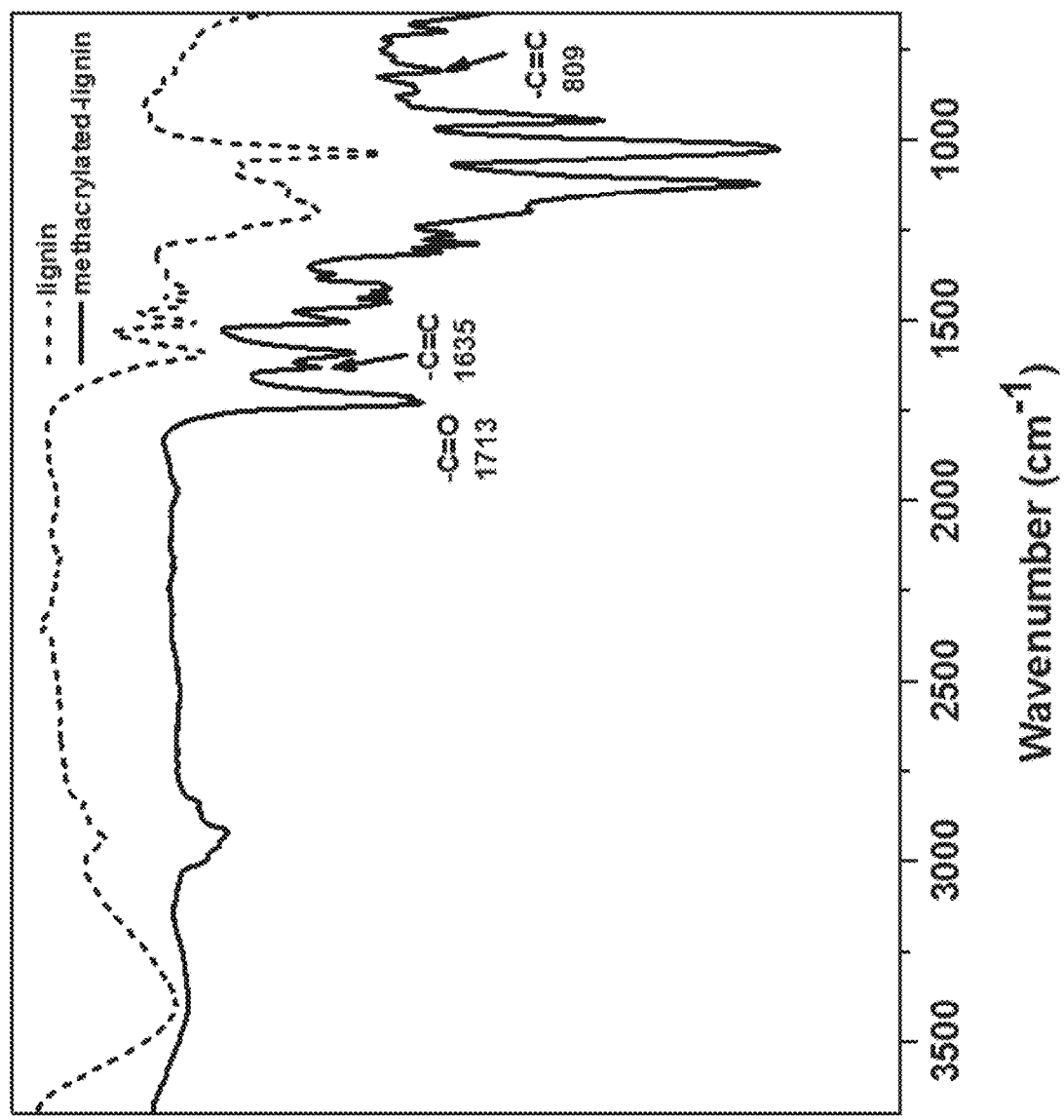
FIG. 5: FTIR spectrum showing the presence of ester bonds in methacrylated lignin.
Figure 6:
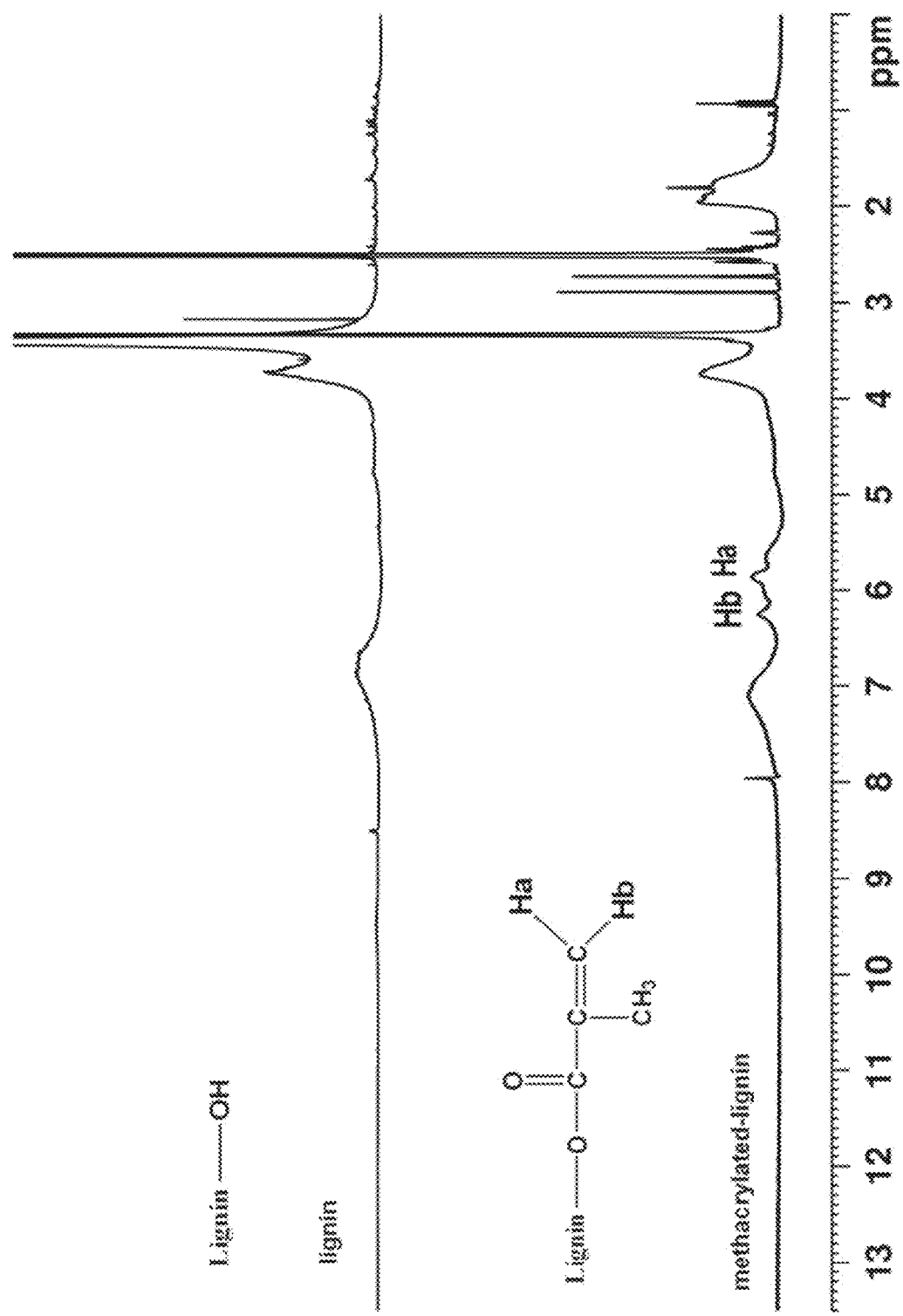
FIG. 6: $^1$H-NMR-spectrum showing the presence of vinyl groups from methacrylate bonded to lignin in methacrylated lignin.

The synthesis of methacrylated lignin is demonstrated in FIG. 3. Around 50% yield was obtained from the reaction. An ester bond is formed when the hydroxyl groups in lignin attack the carbonyl carbon of methacrylic anhydride. The ester bonds were confirmed by the presence of an ester FT-IR at 1710 cm$^{-1}$ (—C=O) in FIG. 5. In addition, the broad hydroxyl group (—OH) band at 3000-3800 cm$^{-1}$ was reduced significantly, an indication that high amounts of hydroxyl group of lignin have been converted. Vinyl groups from methacrylate bonded to lignin were also confirmed by $^1$H-NMR spectrum in FIG. 6. There are two distinctive peaks from two hydrogen atoms adjacent to the double bond of the vinyl group at 5.88 and 6.22 ppm which did not appear in the lignin $^1$H-NMR spectrum before esterification. In addition, it is known that $^1$H-NMR can be used for a quantification of functional groups in lignin by an integration of a characteristic peak. To obtain the degree of substitution, an integration of hydrogen of the double bond region (5.5-6.5 ppm) was divided by an integration of phenolic hydroxyl peaks (8-10 ppm). The esterification reaction performed very well. Since the mole ratio of hydroxyl groups in lignin to methacrylic anhydride was 1:2, more than 0.9 degree of substitution was obtained from the esterification reaction.

Figure 7:
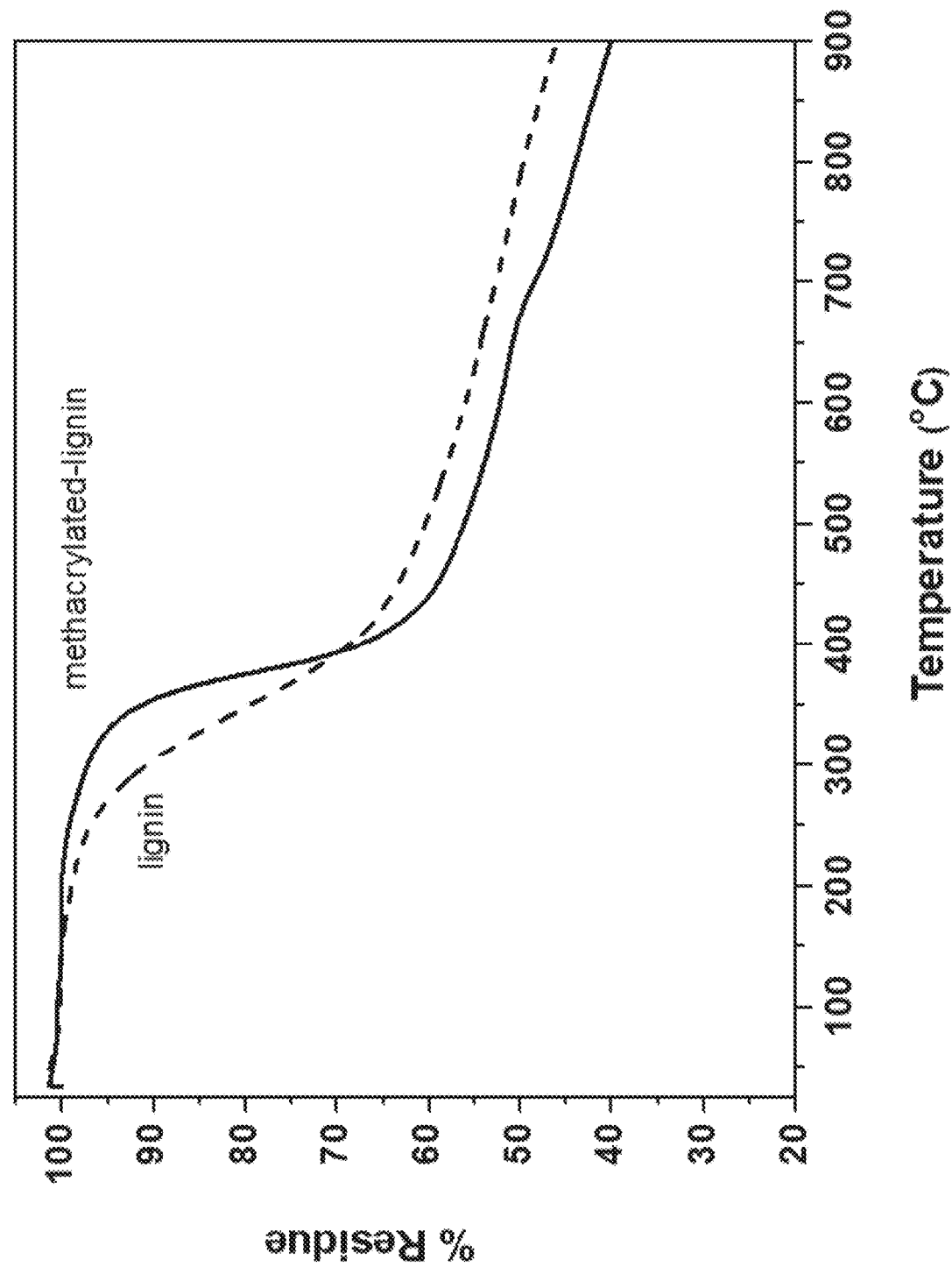
FIG. 7: Diagram showing the results obtained from the thermal analysis to observe the thermal stability of lignin and methacrylated lignin.

The results obtained from the thermal analysis to observe the thermal stability are shown in FIG. 7. The thermal degradation measurement (weight loss of lignin and methacrylated lignin in relation to the temperature of thermal degradation) presented a melting temperature between 200-400° C. However, decomposition of methacrylated lignin occurs at higher temperatures compared to the unmodified lignin which has been found on the thermogram of methacrylated lignin. In general, lignin thermally decomposes over a broad temperature range as observed, because parts of its structure have different thermal stabilities, i.e., their scission occurring at different temperatures. A small increase of glass transition temperature (Tg) after esterification of lignin with methacrylate was observed in the differential scanning calorimetry (DSC) measurement from approximately 82 to 100° C.

Working Example 1

Figure 4:
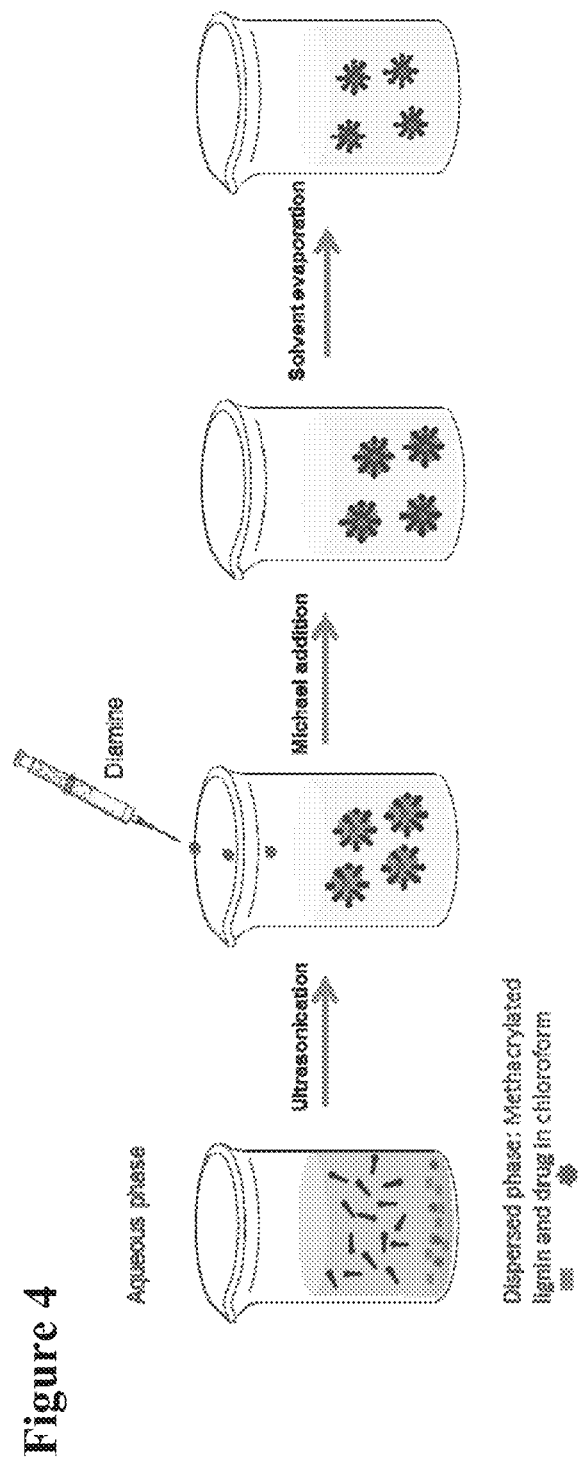
FIG. 4: Schematic representation of an exemplary formation of particles in the miniemulsion process.

Preparation of Crosslinked Lignin Particles 100 mg (1.1 mmol of PPU) of methacrylated lignin were dissolved in 2.5 g of chloroform (CHCl$_3$). This solution was added to 10 g of water containing 20 mg of surfactant (SDS) at room temperature and stirred at 1000 rpm for 1 h in order to form a pre-emulsion. Then the emulsion was treated with ultrasound for 3 min (½ inch sonication tip, 70% amplitude, 20 s ultrasound followed by 10 s pauses) using a Branson Sonifier W-450-Digital under ice cooling in order to prevent evaporation of the solvent. A solution of diamine molecules (2,2'(ethylenedioxy)bis(ethylamine)) in water (1:1 mole ratio to methacrylated lignin) was added to the emulsion after the sonication process. The reaction was carried out overnight at 50° C. The solvent was evaporated from the miniemulsion by stirring overnight at room temperature. The final volume of the dispersion was made up to 10 mL by adding water. The obtained particles were characterized by dynamic light scattering (DLS) and transmission electron microscopy (TEM). To study the grafting efficiency of Michael addition between methacrylated lignin and diamine, the obtained particles were washed with water and chloroform and then dried overnight in a vacuum oven. For the encapsulation of pyraclostrobin (fungicide), 5 mg of pyraclostrobin were added to the dispersed phase prior to mixing with the aqueous phase. The procedures to form lignin particles are shown in FIG. 4.

Test Example 1

Antifungal Test (in Lab and/or Field Test))

In Vitro Test in 96-Well Plates:
The lignin particle-solutions were pipetted in various concentrations (1, 5 and 10 µg/mL) into the 96 wells. Several differing nanoparticles were tested (see FIGS. 10 and 12). Afterwards a spore suspension (in minimal medium) of Esca associated fungi, each fungus separately in three wells, was added to the lignin-particle solution. The final volume was 200 µl per well and 500 spores in those 200 µl (means 2,500 spores/mL). The 96-well plate was incubated at 26° C. for 48 h on a shaker with 120 rpm. The optical density was determined after 24 and 48 h using a lab-bench plate reader (BioRad) at a wavelength of 600 nm.

The controls were empty lignin particles as well as strobilurine and glufosinate ammonium (1, 5 and 10 µg/mL). The optical density of the medium without spores was also measured.

Figure 10:
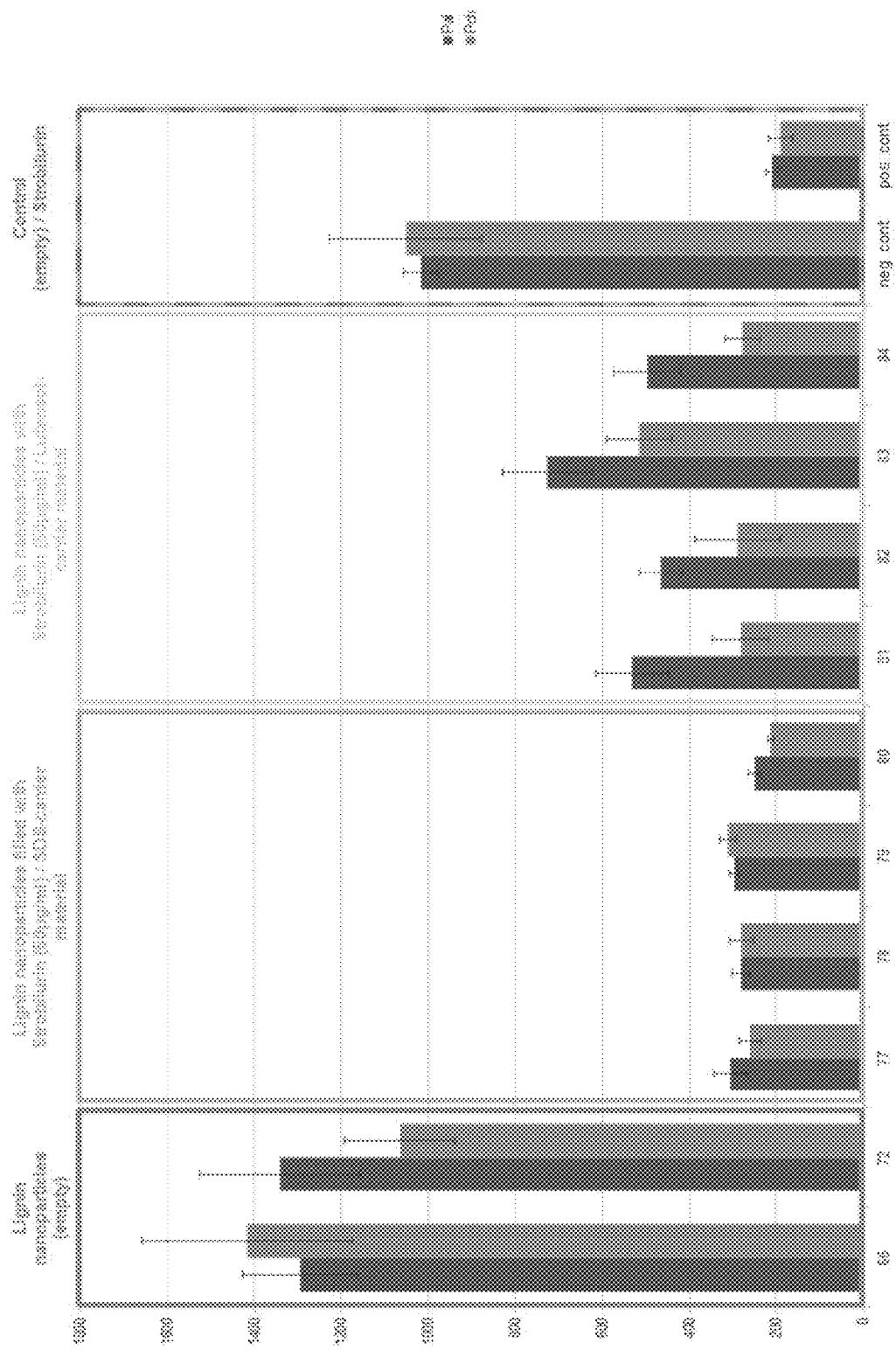
FIG. 10: Diagram showing the results of in-vitro test, using fungicide loaded lignin nanoparticles in a 96-well plate assay (blue: Pal=*Phaeoacremonium aleophilum*, red: Pch=*Phaeomoniella chlamydospora*)

The results of three replicates were afterwards combined to calculate the average value of all samples (see also the standard deviation in FIG. 10).

In Vivo Field Trial:
For the in vivo field trials, two lignin particle preparations were chosen (No. 78 and 80, see Table 1). The two controls were pure pyraclostrobin and empty lignin nanoparticles. The injection was conducted on plants showing an early stage of infection in mid June. All treatments were prepared on four plants randomly chosen in the vineyard. The injection was performed as previously described. And the plants were monitored on a weekly basis from July to October, when the autumnal leaf coloration began. A second treatment was executed in 2015, starting at the end of July.

Working Example 2

Preparation of Lignin Particles in Miniemulsion Process

Methacrylated lignin was dissolved together with an ultrahydrophobe (e.g., hexadecane or a plant oil) in chloroform to generate the dispersed phase (for hollow particles lignin:ultrahydrophobe=75 wt.-%:25 wt.-%, for solid nanoparticles lignin:ultrahydrophobe=97.5 wt.-%:2.5 wt.-%, for porous particles: no ultrahydrophobe). 5 mg of pyraclostrobin were added to the dispersed phase, which was then mixed with the aqueous phase containing the surfactant. Either ionic, such as sodium dodecylsulfate (anionic surfactant), or nonionic (for porous particles, a nonionic surfactant is used), such as Lutensol AT25 (nonionic surfactant) can be used. The pre-emulsion was stirred at room temperature and subsequently ultrasonicated in order to generate a stable miniemulsion. The Michael addition reaction was initiated by heating after a solution of the diamine was added to the previously formed miniemulsion.

Diamines which are soluble both in aqueous and chloroform phase are selected as a crosslinking agent. Two possible routes for crosslinking lignin particles were investigated by adding the diamine molecules to the disperse phase before or after ultrasonication. It was found that by adding diamine molecules to the aqueous phase after forming the droplet prior to heating the emulsion gave the greatest stability of the emulsion.

Lignin was crosslinked by diamine molecules which diffuse from the aqueous phase into the droplet of methacrylated lignin and react with the double bonds of the methacrylated lignin. After 5 h of reaction time, the emulsion was kept open at room temperature overnight in order to ensure complete evaporation of chloroform, leaving behind the aqueous dispersion of the lignin-nanocarriers.

Figure 8:
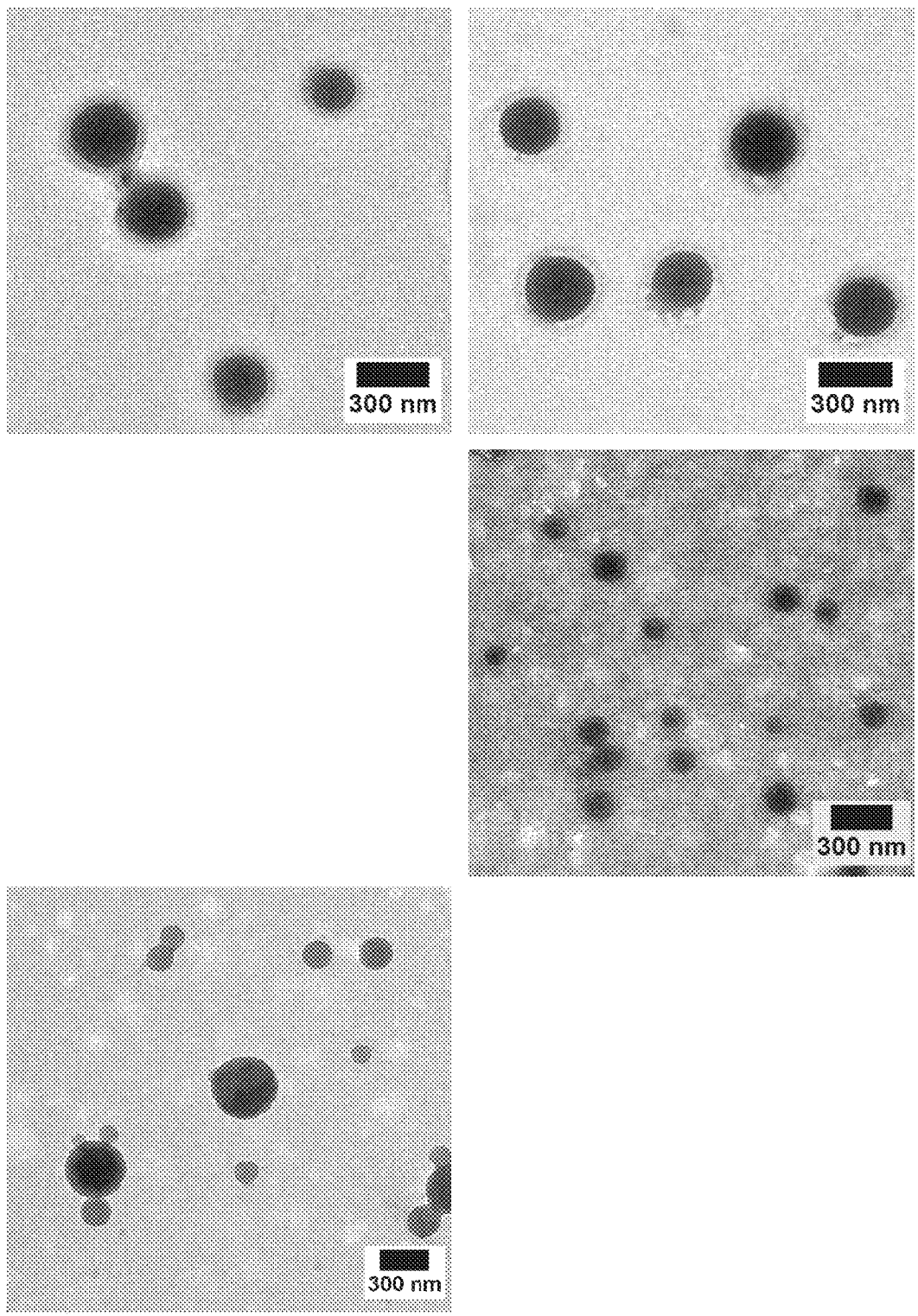
FIG. 8: TEM images showing individual lignin nanoparticles according to the present invention with a well-defined spherical shape.

The miniemulsion conditions and some data results are summarized in Table 1. The number average lignin particle diameters were in the range of 100-600 nm by DLS. TEM was also used to investigate the morphology of fungicide-loaded lignin particles as shown in FIG. 8. TEM images showed individual particles with a well-defined spherical shape with a size of 80-200 nm. The diameter of the lignin particles determined by TEM was generally smaller than those obtained by DLS. The reason is that the particle diameter from DLS relates to the particle surrounded with water molecules, meanwhile from TEM it is in dry state of the particles.

TABLE 1

| Sample | fungicide:lignin mass ratio | Surfactant | Diameter (nm) | PDI | % LC | % EE |
|---|---|---|---|---|---|---|
| 2A | — | SDS 1 mg/mL | 266 | 0.346 | — | — |
| 2B | 1:20 | SDS 1 mg/mL | 314 | 0.217 | 3.9 | 94.0 |
| 2C | 1:10 | SDS 1 mg/mL | 334 | 0.378 | 8.6 | 94.1 |
| 2D | 1:5 | SDS 1 mg/mL | 310 | 0.422 | 15.1 | 97.9 |
| 2E | 1:20 | SDS 0.5 mg/mL | 511 | 0.408 | 4.5 | 98.7 |
| 2F | 1:20 | SDS 2 mg/mL | 220 | 0.354 | 2.1 | 64.0 |
| 2G | 1:20 | Lutensol 1 mg/mL | 641 | 0.289 | 4.5 | 99.7 |
| 2H | 1:20 | Lecithin 1 mg/mL | 645 | 0.389 | 3.5 | 98.1 |

Effect of fungicide to lignin on the size distribution loading content and encapsulation efficiency (Diameter determined by dynamic light scattering (DLS), PDI=polydispersity from DLS, encapsulation efficiency (EE) and the loading content (LC)).

The encapsulation efficiency (EE) and the loading content (LC) of pyraclostrobin in nanoparticles were determined according to the following equations:

$$LC(\%) = \frac{\text{weight of pyraclostrobin in particles}}{\text{weight of particles}} \times 100$$

$$EE(\%) = \frac{\text{weight of pyraclostrobin in particles}}{\text{initial weight of pyraclostrobin}} \times 100$$

Test Example 2

Antifungal Test (in Lab and/or Field Test))

In Vitro Test in 96-Well Plates:
The generated data show the optical density measured at 600 nm. The summary of the data shown below is also presented in FIG. 10. The numbers 1 to 10 and the letters A to H are the labeling of the 96-well plate as well as the grid of the test system. The Numbers 66 to 84 are explained as the tested Lignin-particle solutions, they differ in their composition and fungicide concentration (see also Table 2). The optical density is proportional to the activity of the fungicide. Since the fungal spores only germinate without any fungicidal activity the optical density increase in those wells free of fungicide or with an inactive formulation of the lignin particles. Therefore higher values of the optical density stand for more sporulation and fungal growths and less biological activity of the lignin formulation (e.g., in A1, A2). A low optical density is characteristic for a high fungal toxicity and bioactivity (see in A5 and A6).

concentration of released 2-propylpyridine by UV-visible spectroscopy. This release profile is defined as the mass of 2-propylpyridine released from the capsule suspension divided by the mass of 2-propylpyridine initially dissolved in the oil phase.

To investigate the degradation of lignin nanoparticles by laccase, the emulsions were incubated with laccase (30 mg in 3 mL of emulsion) in an acetate buffer (pH 7) at room temperature overnight before using the dialysis method to

TABLE 2

Figure 11:
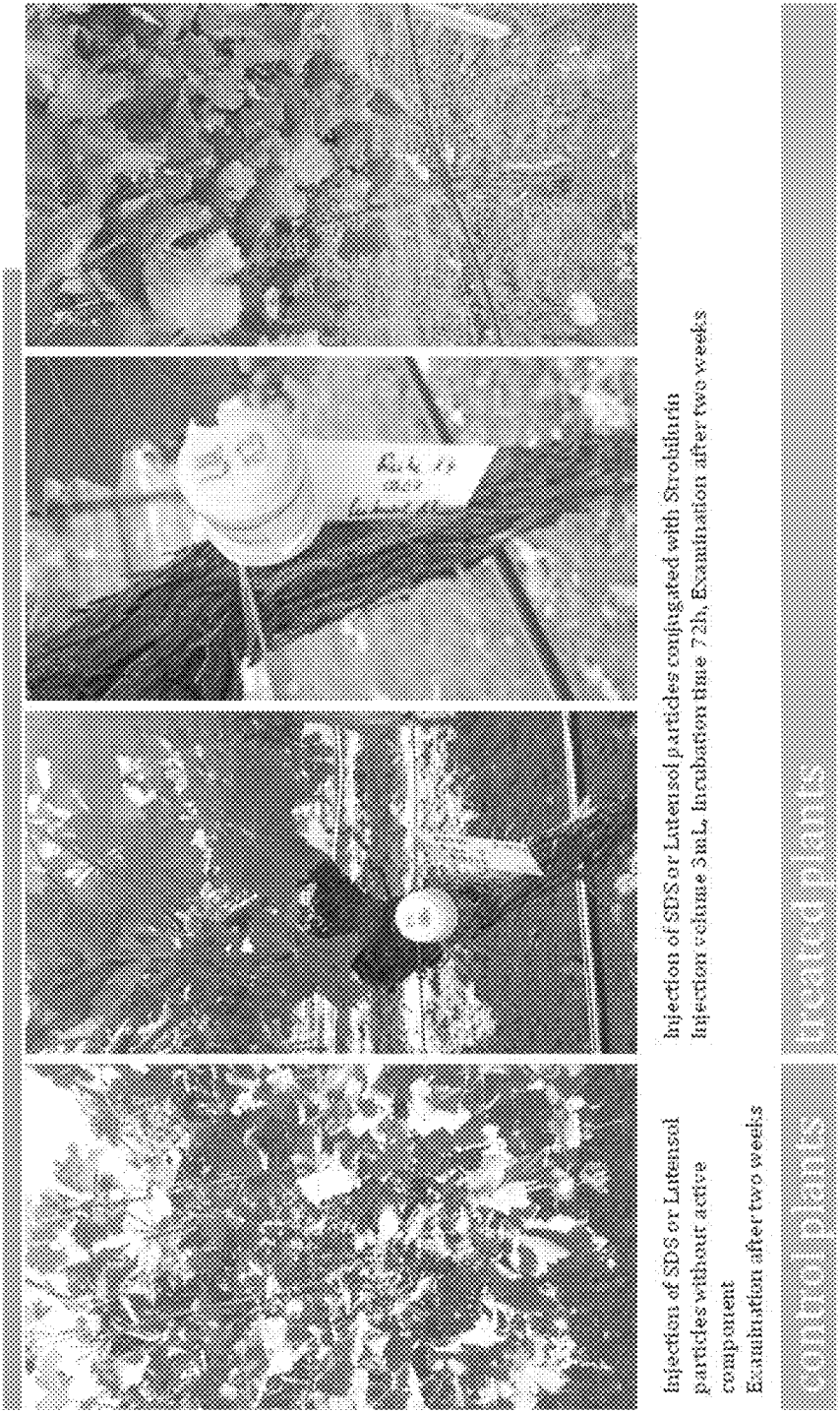
FIG. 11: Example of a field trial injection of nanoparticles into a grapevine plant
Figure 13:
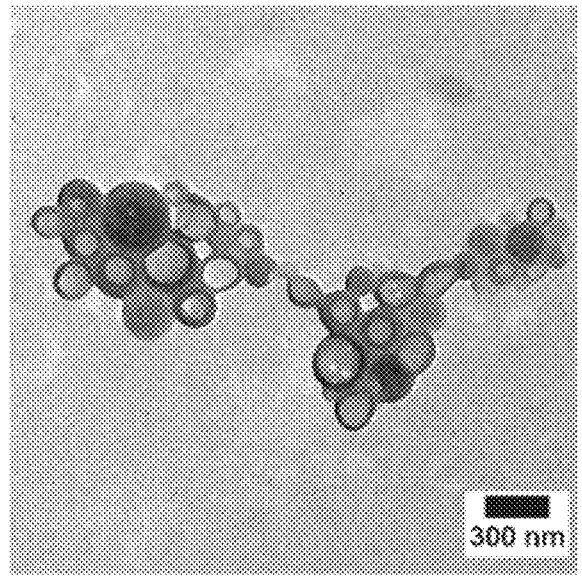
FIG. 13: Hollow lignin nanocapsules with olive oil core—lignin shell
FIG. 14: Porous lignin nanoparticles without the addition of oil or hexadecane
FIG. 15: Release of pyraclostrobin as hydrophobic active agent from lignin nanoparticles crosslinked in the presence of radical initiator AIBN or without after 4 weeks of storage in an aqueous dispersion at 25° C.
Figure 14:
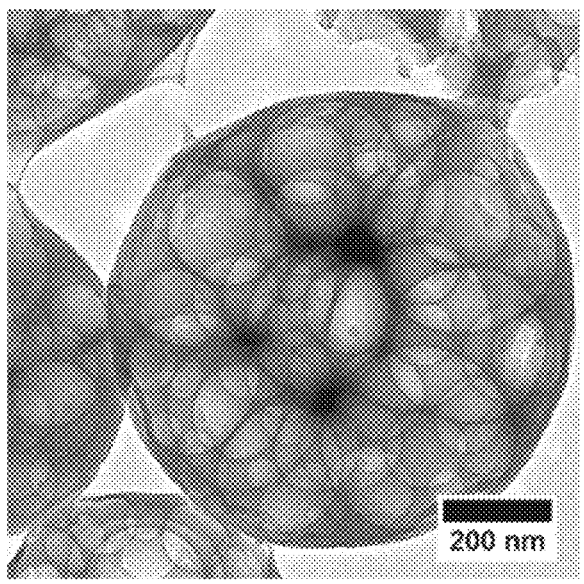

| | empty | | SDS | | | | Lutensol | | | | |
|---|---|---|---|---|---|---|---|---|---|---|---|
| | 66 1 | 72 2 | 77 3 | 78 4 | 79 5 | 80 6 | 81 7 | 82 8 | 83 9 | 84 10 | |
| A | 1.151 | 1.232 | 0.281 | 0.276 | 0.282 | 0.253 | 0.431 | 0.388 | 0.595 | 0.404 | Pal |
| B | 1.232 | 1.152 | 0.313 | 0.308 | 0.308 | 0.257 | 0.471 | 0.441 | 0.780 | 0.445 | Pal |
| C | 1.163 | 1.041 | 0.237 | 0.265 | 0.301 | 0.203 | 0.225 | 0.198 | 0.418 | 0.245 | Pch |
| D | 1.305 | 0.839 | 0.275 | 0.266 | 0.317 | 0.214 | 0.312 | 0.224 | 0.441 | 0.290 | Pch |
| E | 0.707 | 0.853 | 0.192 | 0.180 | 0.200 | | | | | | Pch |
| F | 0.670 | 0.930 | 0.220 | 0.212 | 0.206 | | | | | | Pal |
| G | 0.035 | 0.034 | Background | | Medium | | | | | | |
| H | 0.035 | 0.035 | 0.035 | | | | | | | | |
| A | 1.214 | 1.401 | 0.344 | 0.256 | 0.289 | 0.259 | 0.604 | 0.461 | 0.669 | 0.484 | Pal |
| B | 1.432 | 1.280 | 0.366 | 0.293 | 0.308 | 0.248 | 0.611 | 0.522 | 0.855 | 0.514 | Pal |
| C | 1.344 | 1.193 | 0.282 | 0.303 | 0.324 | 0.205 | 0.360 | 0.265 | 0.516 | 0.252 | Pch |
| D | 1.711 | 0.971 | 0.298 | 0.299 | 0.335 | 0.216 | 0.165 | 0.285 | 0.531 | 0.303 | Pch |
| E | 1.155 | 0.991 | 0.201 | 0.192 | 0.203 | | | | | | Pch |
| F | 0.994 | 1.274 | 0.228 | 0.219 | 0.204 | | | | | | Pal |
| G | 0.035 | 0.035 | Background Medium | | | | | | | | |
| H | 0.037 | 0.037 | 0.036 | | | | | | | | | neg. control (DMSO, 5 μL)
pos. control (Glufosinat-Ammonium, 50 μg)
Pal Phaeoacremonium aleophilum
Pch Phaeomoniella chlamydospora In Vivo Field Trial:

The results of the field trial are up to this day only preliminary. Therefore, only an overview of the treatment is shown (FIG. 11).

Working Example 3

Preparation of Crosslinked Lignin Particles Including a UV-Active Ingredient

Crosslinked lignin particles were prepared in accordance with Working Example 1 except that 10 mg of 2-propylpyridine were added to the oil phase before adding water.

Test Example 3

Release Study

Figure 9:
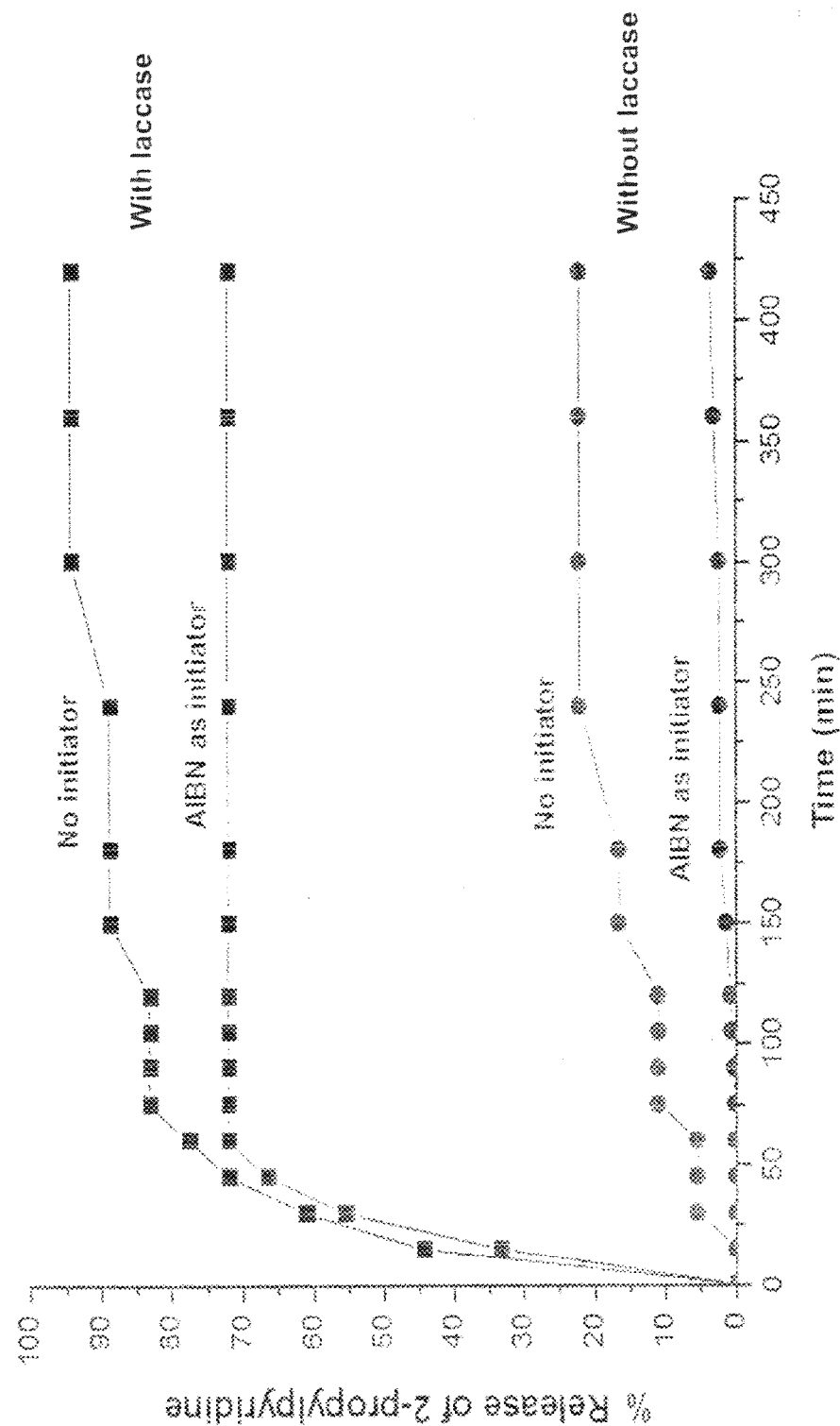
FIG. 9: Diagram showing the results of the release of the hydrophobic active agent obtained by the release test using 2-propylpyrine as a model substance.

In the release study, the crosslinked lignin particles of Working Example 3 were employed. 2-propylpyridine was used as a UV-active ingredient since it is soluble in the oil phase and also partially soluble in the aqueous phase. The driving force for the release corresponds to the oil/water partition coefficient which is 86.3 in the case of 2-propylpyridine. 3 mL of the emulsion (solid content of 1 wt %) were added to a dialysis tubing and immersed into 197 mL of distilled water. 2-propylpyridine has a high molar UV-visible extinction coefficient at 260 nm. Thus, the release profile of the 2-propylpyridine can be determined by measuring the absorbance of the release medium, at 260 nm, as a function of time. 5 mL of release medium (distilled water) were taken at different time intervals to determine the concentration of released 2-propylpyridine from the dialysis tube over time after contact with laccase. The results are shown in FIG. 9.

Working Example 4

Preparation of Crosslinked Lignin Particles including Pyraclostrubin

Crosslinked lignin particles were prepared in accordance with Working Example 1 except that 10 mg pyraclostrubin were added to the oil phase before adding water.

Test Example 4

Long-Term Stability Study

Figure 15:
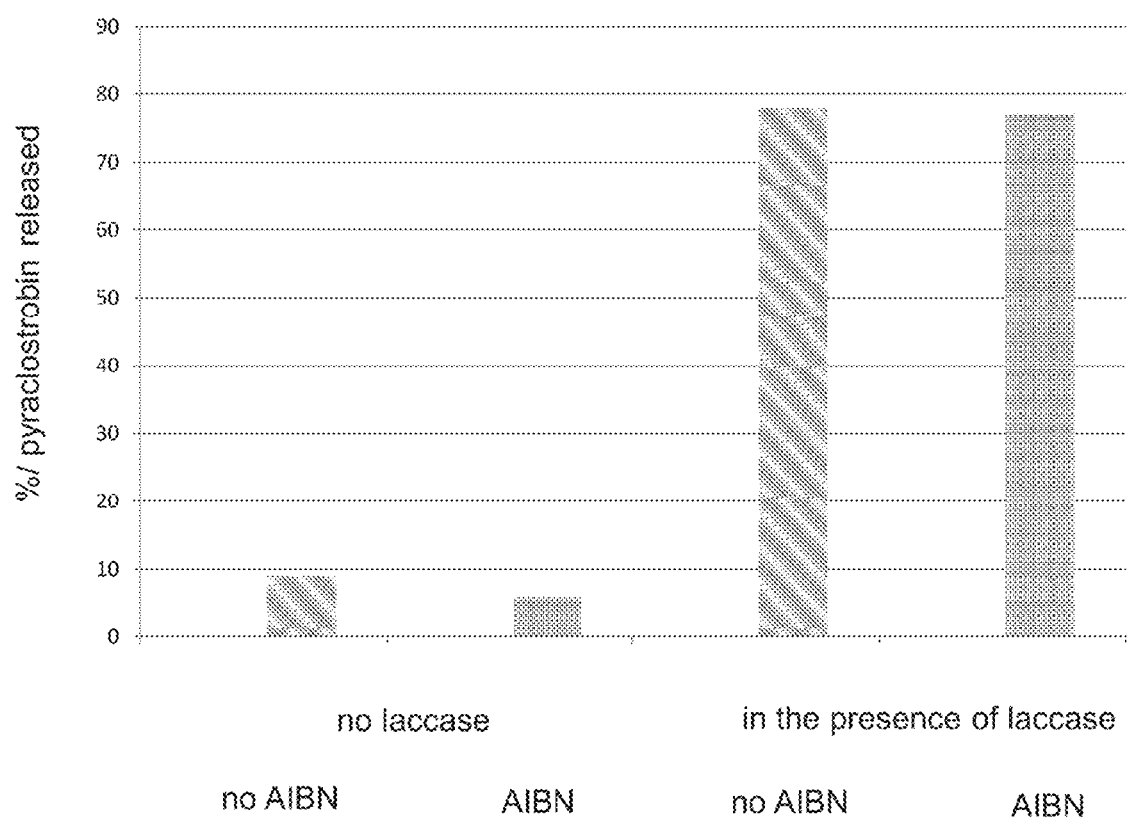

In the long-term stability study, the crosslinked lignin particles of Working Example 2 were employed (1:10, stabilized with SDS). To investigate the density and the enzymatic degradation of lignin nanocarriers by laccase, pyraclostrobin (fungicide) was encapsulated in lignin nanoparticles (10 wt %, as reported in Working Example 4). 2× 1 mL of dispersion (solid content 1 wt %) were stored at 25° C. over a period of 30 days. One of the dispersions was separated by centrifugation at 10000 rpm for 60 min and the supernatant was analyzed by high pressure liquid chromatography for pyraclostrobin concentration. The second dispersion was incubated with 1 mL of laccase in an acetate buffer pH 7 (10 mg/mL) at room temperature overnight before using centrifugation at 10000 rpm for 60 min after that supernatant was collected and the concentration of pyraclostrobin was determined by HPLC. The results are shown in FIG. 15. These experiments show the enzymatic release potential of the lignin nanoparticles prepared according to the present invention and further prove the long term leak tightness in the absence of the enzyme. Working Example 3 and Test Example 3 further show the kinetics of the release of a UV-active ingredient (2-propylpyridine).

Working Example 5

Preparation of Crosslinked Lignin Particles by Michael Addition

The formation of lignin nanocarriers was carried out by a combined miniemulsion polymerization with subsequent solvent evaporation. The typical procedure is the following: Methacrylated lignin (75 mg, 4.8 µmol, 1 mmol of acrylates) including the hydrophobe (25 mg) (hexadecane, or olive oil) and the diamine (1 mmol of amines) were dissolved and mixed in 0.6 mL of chloroform. This solution was added to an aqueous solution (10 mL) of the surfactant (1 wt. % of SDS solution) at room temperature and stirred at 1000 rpm for 30 minutes in order to form a pre-emulsion. Then the emulsion was treated with ultrasound for 3 min (½ inch tip, 70% amplitude, 20 s ultrasound followed by 10 s pauses) under ice cooling in order to prevent evaporation of the solvent and the initiation of the polymerization due to heating. After the formation of the stable miniemulsion, the crosslinking polymerization was carried out for 5 hours at 60° C. and mild stirring. After the polymerization, the solvent was evaporated from the miniemulsion by stirring it in an open vessel overnight at ambient temperature (ca. 21° C.). The final volume of dispersions was adjusted to 10 mL with distilled water (typical solid contents of the dispersions were ca. 10 mg/mL).

Working Example 6

Preparation of Crosslinked Lignin Particles by Radical Polymerization

The formation of lignin nanocarriers was carried out by a combined miniemulsion polymerization with subsequent solvent evaporation. The typical procedure is the following: Methacrylated-lignin (75 mg, 4.8 µmol, 1 mmol of acrylates) including the hydrophobe (25 mg) (hexadecane, or olive oil) and the initiator (20 mg of AIBN) were dissolved and mixed in 0.6 mL of chloroform. This solution was added to an aqueous solution (10 mL) of the surfactant (1 wt. % of SDS solution) at room temperature and stirred at 1000 rpm for 30 minutes in order to form a pre-emulsion. Then the emulsion was treated with ultrasound for 3 min (½ inch tip, 70% amplitude, 20 s ultrasound followed by 10 s pauses) under ice cooling in order to prevent evaporation of the solvent and the initiation of the polymerization due to heating. After the formation of the stable miniemulsion, the crosslinking polymerization was carried out for 5 hours at 60° C. and mild stirring. After the polymerization, the solvent was evaporated from the miniemulsion by stirring it in an open vessel overnight at ambient temperature (ca. 21° C.). The final volume of dispersions was adjusted to 10 mL with distilled water (typical solid contents of the dispersions were ca. 10 mg/mL).

Working Example 7

Preparation of Crosslinked Lignin Particles by Olefin Metathesis

The typical procedure is the following: Methacrylated-lignin (75 mg, 4.8 µmol, 1 mmol of acrylates) including the hydrophobe (25 mg) (hexadecane, or olive oil) and the diolefin (1 mmol olefin) were dissolved and mixed in 0.6 mL of chloroform. This solution was added to an aqueous solution (10 mL) of the surfactant (1 wt. % of SDS solution) at room temperature and stirred at 1000 rpm for 30 minutes in order to form a pre-emulsion. Then the emulsion was treated with ultrasound for 3 min (½ inch tip, 70% amplitude, 20 s ultrasound followed by 10 s pauses) under ice cooling in order to prevent evaporation of the solvent and the initiation of the polymerization due to heating. After the formation of the stable miniemulsion, the crosslinking polymerization was initiated by the addition of the Grubbs-Hoveyda $2^{nd}$ generation catalyst (5 mg) dissolved in toluene and transferred dropwise into the miniemulsion. The temperature was raised to 40° C. and reaction was allowed to proceed overnight. After the polymerization, the solvent was evaporated from the miniemulsion by stirring it in an open vessel overnight at ambient temperature (ca. 21° C.). The final volume of dispersions was adjusted to 10 mL with distilled water (typical solid contents of the dispersions were ca. 10 mg/mL).

Working Example 8

Preparation of Crosslinked Lignin Particles by Azide-Alkyne-Cycloaddition

The typical procedure is the following: modified-lignin (75 mg, 4.8 µmol, 1 mmol of alkynes) including the hydrophobe (25 mg) (hexadecane, or olive oil) and the diazide (1 mmol azides) were dissolved and mixed in 0.6 mL of chloroform. This solution was added to an aqueous solution (10 mL) of the surfactant (1 wt. % of SDS solution) at room temperature and stirred at 1000 rpm for 30 minutes in order to form a pre-emulsion. Then the emulsion was treated with ultrasound for 3 min (½ inch tip, 70% amplitude, 20 s ultrasound followed by 10 s pauses) under ice cooling in order to prevent evaporation of the solvent and the initiation of the polymerization due to heating. After the formation of the stable miniemulsion, the crosslinking polymerization was initiated by the addition of the catalyst (5 mg) dissolved in toluene and transferred dropwise into the miniemulsion. The temperature was raised to 50° C. and reaction was allowed to proceed overnight. After the polymerization, the solvent was evaporated from the miniemulsion by stirring it in an open vessel overnight at ambient temperature (ca. 21° C.). The final volume of dispersions was adjusted to 10 mL with distilled water (typical solid contents of the dispersions were ca. 10 mg/mL).

The invention claimed is:
1. A process for the production of lignin nanoparticles comprising a hydrophobic active agent,
the process comprising the following steps:
(i) dissolving modified lignin and a hydrophobic active agent in an organic solvent having low solubility in water to form a solution;
(ii) combining the solution with water and a surfactant to form a pre-emulsion;
(iii) forming an emulsion from the pre-emulsion; and
(iv) crosslinking the modified lignin to form lignin nanoparticles comprising the hydrophobic active agent,
wherein the modified lignin is lignin which is chemically modified to comprise at least two functional groups suitable for polymerization and/or crosslinking, and
wherein the nanoparticles are solid particles that are not hollow, and wherein the crosslinked lignin and the hydrophobic active agent are homogeneously distributed throughout the particle.

2. The process of claim 1, further comprising after the crosslinking step (iv) a step (v):
(v) evaporating the organic solvent.

3. The process of claim 2, further comprising after the step (v) a step (vi):
(vi) separating the lignin nanoparticles from the aqueous phase.

4. The process of claim 3, further comprising after the separating step (vi) a step (vii):
(vii) removing remaining water and organic solvent to achieve a powder of lignin nanoparticles comprising the hydrophobic active agent.

5. The process of claim 1, wherein the modified lignin is a lignin which is chemically modified to comprise at least two functional groups per modified lignin molecule which are suitable for polymerization and/or crosslinking.

6. The process of claim 5, wherein the functional groups are selected from terminal double bonds, epoxy groups, alkynyl groups, aldehyde groups, keto groups, or silane groups.

7. The process of claim 6, wherein the functional groups are (meth)acrylate groups.

8. The process of claim 5, wherein at least 50% of the hydroxyl groups present in the lignin before the modification are modified.

9. The process of claim 1, wherein the organic solvent having low solubility in water is selected from hydrocarbon solvents, halogenated hydrocarbons, alcohols, or organic compounds having a nitro group.

10. The process of claim 1, wherein the hydrophobic active agent is a pesticide.

11. The process of claim 1, wherein the organic solvent having low solubility in water employed in step (i) comprises an osmotic pressure agent.

12. The process of claim 11, wherein in step (iii) a miniemulsion is formed.

13. The process of claim 1, wherein the surfactant employed in step (ii) is selected from an anionic surfactant, a cationic surfactant, a nonionic surfactant, or a combination thereof.

14. The process of claim 1, wherein the emulsion is formed in step (iii) by ultrasonication and/or high-pressure homogenization.

15. The process of claim 1, wherein the modified lignin is lignin having terminal double bonds and the crosslinking in step (iv) is achieved by:
(1) adding an amine compound having at least two amino groups and/or a thiol compound having at least two thiol groups to the emulsion obtained in step (iii) and conducting a Michael addition;
(2) conducting radical polymerization; or
(3) adding a diene to the emulsion obtained in step (iii) and conducting olefin metathesis.

16. The process of claim 15, wherein modified lignin is (meth)acrylated lignin which is obtained by one of the following methods:
(a) reacting OH-groups of lignin with (meth)acrylic anhydride;
(b) reacting OH-groups of lignin with (meth)acryloyl chloride; or
(c) reacting OH-groups of lignin with epichlorohydrin and reacting the reaction product with (meth)acrylic acid.

17. The process of claim 1, wherein the modified lignin is a lignin modified with epoxy groups and the crosslinking in step (iv) is achieved by:
adding an amine compound having at least two amino groups to the emulsion obtained in step (iii).

18. The process of claim 1, wherein the modified lignin is an alkynated lignin and the crosslinking in step (iv) is achieved by:
(1) adding a compound having at least two azide groups to the emulsion obtained in step (iii) and conducting azide-alkyne-cycloaddition; or
(2) conducting alkyne metathesis.

19. The process of claim 1, wherein the modified lignin is a lignin modified with aldehyde or keto groups and the crosslinking in step (iv) is achieved by:
adding an amine compound having at least two amino groups to the emulsion obtained in step (iii).

20. The process of claim 1, wherein the modified lignin is a lignin modified with silane groups and the crosslinking in step (iv) is achieved by:
conducting hydrosilylation.

* * * * *